(12) United States Patent
Zapata et al.

(10) Patent No.: US 12,319,423 B2
(45) Date of Patent: Jun. 3, 2025

(54) METHOD FOR CONTROLLING A THRUST UNIT FOR A PROPULSION DEVICE

(71) Applicant: ZIPAIR, Chateauneuf-les-Martigues (FR)

(72) Inventors: Frankie Zapata, Le Rove (FR); Laurent Aulagnier, Marseilles (FR); Adrien Uhl, Aix-en-Provence (FR)

(73) Assignee: ZIPAIR, Chateauneuf-les-Martigues (FR)

( * ) Notice: Subject to any disclaimer, the term of this patent is extended or adjusted under 35 U.S.C. 154(b) by 0 days.

(21) Appl. No.: 18/041,813

(22) PCT Filed: Jul. 21, 2022

(86) PCT No.: PCT/FR2022/051458
§ 371 (c)(1),
(2) Date: Feb. 16, 2023

(87) PCT Pub. No.: WO2023/067252
PCT Pub. Date: Apr. 27, 2023

(65) Prior Publication Data
US 2024/0262520 A1 Aug. 8, 2024

(30) Foreign Application Priority Data
Oct. 20, 2021 (FR) .................................... 2111126

(51) Int. Cl.
*B64D 31/10* (2006.01)
*B64C 17/00* (2006.01)
*B64C 29/00* (2006.01)

(52) U.S. Cl.
CPC .............. *B64D 31/10* (2013.01); *B64C 17/00* (2013.01); *B64C 29/0025* (2013.01); *B64C 29/0058* (2013.01)

(58) Field of Classification Search
CPC ...... B64D 31/10; B64C 17/00; B64C 29/0025; B64C 29/0058
See application file for complete search history.

(56) References Cited

U.S. PATENT DOCUMENTS 2,417,896 A 3/1947 Zimmerman
3,979,655 A * 9/1976 Rutshtein ............. G05D 16/208
318/609

(Continued)

FOREIGN PATENT DOCUMENTS

| CA | 2754091 A1 | 9/2010 |
| CN | 112173079 A | 1/2021 |

(Continued)

OTHER PUBLICATIONS

The Internal Combustion Engine Modelling Modelling, Estimation and Control Issues Vigild, Christian Winge (Year: 2002).*

(Continued)

*Primary Examiner* — Donald J Wallace
*Assistant Examiner* — Jalal C Coduroglu
(74) *Attorney, Agent, or Firm* — BUCHANAN, INGERSOLL & ROONEY PC

(57) ABSTRACT

The invention relates to a method for correcting the thrust vector created by a thrust unit associated with electrical correction means of the thrust vector. Such a thrust unit comprises a mechanical rotor moved in rotation by a rotary shaft of an internal combustion engine in response to a power command. Such a method comprises a step of generating this latter in order to reduce the error value between a rotation speed setpoint and a measured rotation speed of the shaft of the internal combustion engine and thus to correct the speed of the shaft of said internal combustion engine. The method also comprises a step of generating an actuation command of thrust vector electrical correction means generated based on the error value independently of (Continued)

the speed correction of the shaft of the internal combustion engine.

27 Claims, 6 Drawing Sheets

(56) References Cited

U.S. PATENT DOCUMENTS

| | | | |
|---|---|---|---|
| 7,032,861 B2 | 4/2006 | Sanders et al. | |
| 8,056,866 B2 | 11/2011 | De Roche | |
| 8,157,205 B2* | 4/2012 | McWhirk | B64B 1/06 |
| | | | 244/30 |
| 10,919,641 B2* | 2/2021 | Mikic | G06V 40/103 |
| 2006/0162476 A1* | 7/2006 | Zimmermann | F16H 61/32 |
| | | | 74/335 |
| 2008/0243313 A1* | 10/2008 | Schaeffer | B64C 29/0033 |
| | | | 701/3 |
| 2012/0109424 A1 | 5/2012 | Fervel et al. | |
| 2017/0081038 A1* | 3/2017 | Looper | B64D 27/10 |
| 2019/0047714 A1 | 2/2019 | Looper et al. | |
| 2019/0078574 A1* | 3/2019 | Calosi | F04D 27/001 |
| 2019/0161188 A1* | 5/2019 | Zapata | B64D 37/06 |
| 2021/0171188 A1* | 6/2021 | Charron | B64C 39/026 |
| 2021/0347472 A1* | 11/2021 | Karem | B64C 39/08 |
| 2021/0403155 A1* | 12/2021 | Neiser | B64C 29/0033 |
| 2022/0089279 A1* | 3/2022 | Rosen | B64C 29/02 |
| 2022/0363378 A1* | 11/2022 | Schlak | B64C 29/0025 |
| 2023/0051515 A1* | 2/2023 | Baladi | B64C 17/06 |
| 2023/0111162 A1* | 4/2023 | Zapata | B64C 39/026 |
| | | | 60/230 |
| 2024/0246669 A1* | 7/2024 | Becchi | B64C 29/0033 |

FOREIGN PATENT DOCUMENTS

| | | |
|---|---|---|
| EP | 3495262 A1 | 6/2019 |
| WO | 2017174942 A1 | 10/2017 |
| WO | 2019030460 A1 | 2/2019 |

OTHER PUBLICATIONS

International Search Report (PCT/ISA/210) and Written Opinion (PCT/ISA/237) mailed on Nov. 9, 2022, by the European Patent Office as the International Searching Authority for International Application No. PCT/FR2022/051458.

* cited by examiner

METHOD FOR CONTROLLING A THRUST UNIT FOR A PROPULSION DEVICE

The invention relates to the field of propulsion devices, preferably but non-limitatively vertical-propulsion aircraft, adapted or arranged to provide the lifting and movements of a load, whether constituted by one or more passengers, human or animal, and/or one or more solid or liquid goods the transportation of which is to be provided by the propulsion device. The invention relates in particular to improvements of a thrust unit of such a propulsion device, designed to confer greater responsiveness of said thrust unit and consequently a very high stabilization of the attitude of said device and high precision in its trajectories. The invention is intended to be very simple to implement and accessible to the greatest number of propulsion devices, whether as the main or secondary application, in the aerial, terrestrial or aquatic fields. In the remainder of the document, the invention will be described, preferably but non-limitatively, as applied to an aircraft or heavier-than-air aircraft, arranged to provide a substantially vertical take-off and landing capability. By way of non-limitative examples, such a propulsion device can consist of a drone, a quadcopter or octocopter or a flying device an embodiment example of which is described in document WO 2017/174942 A1. However, the invention is not to be considered limited to these application examples alone, and could instead be employed with respect to any type of load propulsion device.

Such a propulsion device generally comprises a thrust unit comprising a thermal engine, also called hereinafter "internal combustion engine". The latter can consist of a rotary-shaft engine, of the two-stroke or four-stroke engine type, coupled with a mechanical rotor to deliver a thrust vector, i.e. a thrust force in a given direction. In a variant, such an internal combustion engine can consist of a turbojet. FIG. 1 shows a first example of a propulsion device taken from the document WO 2017/174942 A1. A propulsion device 10 that could be described as a "flying motorcycle" comprises two systems, TSa and TSb, for example respectively comprising two thrust units 12a and 12b, each delivering a resultant thrust vector AL12a and AL12b. According to the example in FIG. 1, each thrust unit is equipped with a plurality of internal combustion thrusters in the form of turbojets. Each turbojet, for example the turbojet 12a1, can be described as the combination of a rotary-shaft internal combustion engine coupled with a mechanical rotor. Such a turbojet converts the potential energy contained in a fuel, for example kerosene or equivalent, in association with an oxidizing agent, in this case ambient air aspirated via a fluid intake, into kinetic energy. This kinetic energy generates a reaction force in an elastic medium, in the opposite direction to the jet of gaseous discharge. This results in an acceleration of a certain quantity of air between the fluid intake of the thruster and the jet nozzle or discharge outlet 12a-o thereof, producing a thrust by expansion in said jet nozzle. The turbojet 12a1 thus generates its own thrust vector AL12a1. The resultant thrust vector AL12a of the thrust unit 12a consists of the conjunction of the thrust vectors respectively generated by the turbojets of which it is composed. The thrust units 12a and 12b are held by support means 14 mutually arranged with the platform 11, in particular so that the thrust vectors AL12a, AL12b of said thrust units 12a and 12b are oriented substantially normal to a platform 11, which for the sake of simplicity can be reduced to the equivalent of a virtual plane P11 represented in dashed lines in FIG. 1, said plane P11 being a plane that is substantially horizontal when said aerial propulsion device 10 is placed on a horizontal support. Thus, under the effect of said thrust vectors AL12a and AL12b, a load 1 carried by said platform 11 can be lifted vertically. In this case in FIG. 1, said load consists mainly of a human passenger 1.

According to the example in FIG. 1, the arrangement of the support means 14 is such that said turbojets of the two thrust units are advantageously arranged substantially along a longitudinal axis AL10 of the platform 11, i.e. along an axis oriented from the tail to the nose of the propulsion device 10, comprised within the plane P11. The thrust vectors AL12a and AL12b of said turbojets of the thrust units 12a and 12b are thus inscribed within one and the same plane (not shown in FIG. 1 for the sake of simplicity) normal to said platform 11, i.e. normal to the virtual plane P11 symbolizing the latter. It is noted that according to this example, the centre of gravity CG10 of the body of the device 10 is situated above the fluid discharge outlets of said turbojets of the thrust systems TSa and TSb. Such an arrangement makes it possible for said passenger 1, by simply tilting their body, to cause a change of direction (or "yaw trajectory"). According to this example, the thrust systems TSa and TSb of the propulsion device 10 also respectively comprise attitude correction means 19a and 19b in the form of electric secondary thrusters, in this case in FIG. 1 electric turbines, arranged at the ends (nose and tail) of the body of said propulsion device 10. Said attitude correction means 19a and 19b respectively deliver additional thrust vectors AL19a and AL19b parallel to the thrust vectors AL12a and AL12b delivered jointly by the turbojets of the thrust units 12a and 12b. The electric turbines 19a and 19b are used to modify the attitude of the platform 11. In fact, according to the document WO 2017/174942 A1, the power of these latter is regulated by a navigation or flight controller 30, in the form of electronic processing means, using a control instruction from the passenger 1, to cause a change in attitude so as to cause the vehicle to "nose up" under the positive action of the thrust force of the nose secondary thruster 19a or, conversely, to make the nose thereof "dive" under the positive action of the thrust force of the tail secondary thruster 19b. Such a change of attitude, combined with the thrust delivered by the thrust units 12a and 12b, causes a horizontal displacement of the propulsion device 10 forwards or backwards. Said electric secondary thrusters 19a and 19b can also be automatically actuated by said navigation controller 30 to stabilize or maintain an attitude substantially constant of the propulsion device 10 in response to measurement data originating from an inertial unit, for example integrated with said navigation controller 30. When one or other of the attitude correction secondary thrusters 19a or 19b is actuated, its thrust vector AL19a AL19b is added to the thrust vectors AL12a and AL12b generated by the thrust units 12a and 12b. Instead of turbojets, such a propulsion device could be moved by thermal engines, for example of the two-stroke or four-stroke engine type, driving a mechanical rotor as described in the document U.S. Pat. No. 2,417,896.

FIG. 2 depicts a second example aerial propulsion device allowing a load carried thereby to be lifted. A technical teaching is taken from the document EP 3495262 A1. This involves a quadcopter comprising means 14 supporting thrusters, said support means 14 being in the form of four arms describing an "X" above a substantially planar platform 11. Each arm supports a thrust system TSa, TSb, TSc, TSd, each comprising a thrust unit 12a, 12b, 12c, 12d composed of a thermal thruster, similar to the preceding example, in the form of a turbojet. In order to lift a load, not shown in FIG. 2, carried by the platform 11, the four thrust units 12*a*, 12*b*, 12*c*, 12*d* each comprising a turbojet, respectively deliver thrust vectors AL12*a*, AL12*b*, AL12*c*, AL12*d*, substantially normal to the platform 11. In order to land without damaging the jet nozzles or fluid discharge outlets of the turbojets of the thrust units 12*a* to 12*d*, the arms of the support means 14 of the thrust systems TSa, TSb, TSc and TSd cooperate, at the level of their respective distal parts, with advantageously telescopic projecting means or legs 17. A navigation or flight controller 30, in the form of electronic processing means, delivers thrust commands to the thrust systems TSa, TSb, TSc, TSd. The fluid outlets of the thrusters of the thrust systems are positioned above or below, substantially at the level of the centre of gravity CG10 of the device 10 according to the configuration and arrangement of the support means 14. In order to modify and stabilize the attitude of the platform 11, each thrust system TSa to TSd comprises correction means 19*a*, 19*b*, 19*c*, 19*d* of the thrust vectors AL12*a*, AL12*b*, AL12*c*, AL12*d* respectively delivered by the thrust units 12*a* to 12*d*. The means 19*a* to 19*d* are also controlled by the electronic navigation controller 30.

FIG. 3 shows the arrangement of such correction means of the thrust vector 19*a* associated with the thrust unit 12*a* of the thrust system TSa according to FIG. 2. Said correction means 19*a* of the thrust vector comprise a pair of deflector guides 19*a*-1 and 19*a*-5 that are moveably mounted, more specifically by means of respective pivot links 19*a*-2 and 19*a*-6. Said deflector guides 19*a*-1 and 19*a*-5 are arranged to deflect all or part of the thrust vector AL12*a* at the level of a region close to the fluid discharge outlet 12*a*-*o* of the turbojet 12*a*-*e* of the thrust unit 12*a*. The deflector assembly composed of the deflector guides 19*a*-1 and 19*a*-5 thus makes it possible to describe a "pinching" of said thrust vector AL12*a*. The deflector guides 19*a*-1 and 19*a*-5 are advantageously actuated respectively by a pair of cam actuators or servomotors, of which only the actuator 19*a*-3 can be seen in FIG. 3. Thus, the actuator 19*a*-3 cooperates by means of a control rod 19*a*-4 with the deflector guide 19*a*-1. Actuation of the cam of the actuator 19*a*-3 causes a rotary movement r of the deflector guide 19*a*-1 about the shaft 19*a*-2 situated above the fluid discharge region of the turbojet 12*a*, which limits the torque required by the actuator 19*a*-3 to overcome and withstand the aspiration or the discharge generated by the thrust vector AL12*a* delivered by the turbojet 12*a*-*e* of the thrust unit 12*a* during closing and opening of the deflector guide 19*a*-1. When the cam actuators, such as the actuator 19*a*-3, associated respectively with the deflector guides 19*a*-1 and 19*a*-5 cause a pinching of the thrust vector AL12*a* by these latter, said thrust vector AL12*a* is subdivided downstream of said deflector guides into two or three components AL12*a*, AL12*a*', AL12*a*'' according to whether a particular deflector guide 19*a*-1 or 19*a*-5 enters or does not enter the stream discharged at the fluid outlet 12*a*-*o* of the turbojet 12*a*-*e*. In an "open" configuration according to which the deflector guides 19*a*-1 and 19*a*-5 are positioned substantially outside the trajectory of the thrust vector AL12*a*, the force of said thrust vector AL12*a* is maximum. Conversely, when one (or both) of the two deflector guides 19*a*-1, 19*a*-5 "pinches" said thrust vector, the resultant thrust force of said thrust vector AL12*a*, downstream of said deflector guides 19*a*-1 and 19*a*-5, is reduced, until it is cancelled during a "total pinching" of said deflector guides 19*a*-1 and 19*a*-5 of the outlet stream from the jet nozzle 12*a*-*o* of the turbojet. Depending on the arrangement of said deflector guides 19*a*-1 and 19*a*-5, these latter being similar in FIG. 3 to two scoops or substantially curvilinear semicircular surfaces facing one another, in the event of a "closed" configuration of the two guides 19*a*-1 and 19*a*-5, a counterthrust can result, i.e. a thrust vector in an opposite direction to that of the thrust vector AL12*a* at the fluid discharge outlet 12*a*-*o*. Such a counterthrust, for example of the order of ten to thirty percent, can be made possible by virtue of the shape of said guides. In fact, these latter can be arranged respectively to guide fluid flows causing at the outlet (distal parts) of said guides, secondary thrust vectors AL12*a*' and AL12*a*'' oriented in substantially opposite directions to the direction of the original thrust vector AL12*a* at the fluid discharge outlet 12*a*-*o* of the turbojet 12*a*-*e*.

The different embodiments of a thrust system of an aerial propulsion device described by way of non-limitative examples with reference to FIGS. 1 to 3 share one and the same general principle. It consists of providing an electronic navigation controller 30 controlling main thrusters (thrust units such as the unit 12*a*) associated with secondary thrusters for correcting attitude (such as the means 19*a*). Such an electronic navigation controller 30 can thus principally apply the primary power of the main thrusters, then apply the auxiliary power of the secondary thrusters for correcting the attitude of the aerial propulsion device based on a measurement delivered by an inertial unit, independently of the power commands generated by said electronic navigation controller 30 for each of said main thrusters. Finally, when the attitude correction by means of the secondary attitude correction thrusters proves insufficient, said propulsion device electronic navigation controller 30 once again acts on the power of the main thrusters to thereby increase or reduce the amplitude of the thrust vector.

Generally the main thrusters are internal combustion engines, on the one hand to deliver the power required to lift the propulsion device 10 into the air and on the other hand, to provide sufficient operational range in terms of flight duration. With respect to the secondary thrusters, these are generally electrically controlled motors, selected and dimensioned for their responsiveness, this being greater than that of comparable internal combustion engines which are handicapped by inertia for stabilizing the attitude of the propulsion device 10 on their own. On the other hand, the operational range and the power of electric secondary thrusters are generally lower than those of the thermal thrusters. It is therefore appropriate to use both types of thrusters, thermal (internal combustion) and electric, in order to improve the responsiveness of the thrust systems while maintaining a satisfactory operational range with respect to energy.

The results of such a design based on generating successive power commands for internal combustion thrusters, then those for electric thrusters, are the low responsiveness and tonicity of the aerial propulsion devices, limited stabilization of attitude, control accuracy that can clearly be improved, reduced operational range of the different thrusters, some being required to correct the insufficiencies or failures of the others. Furthermore, the processing implemented by an electronic navigation controller 30 of such an aerial propulsion device 10, in order to generate the power commands of the different main 12*a*, 12*b*, 12*c*, 12*d* and secondary 19*a*, 19*b*, 19*c*, 19*d* thrusters proves complex to design and implement to propose satisfactory flight of said aerial propulsion device 10.

The invention makes it possible to meet all or part of the drawbacks resulting from the solutions that are known or mentioned above.

Among the numerous advantages contributed by the invention, there may be mentioned that the latter makes it possible to:

propose thrust systems combining operational range, power and responsiveness;

simplify the processing implemented by an electronic navigation controller, the latter now only having to send thrust commands to one or more thrust systems, regardless of the technologies or the respective arrangements of these latter;

decentralize the processing for correcting thrust vectors at the level of each thrust system, to convert thrust commands originating from a central electronic navigation controller into power commands to (internal combustion) thermal thrusters and/or for actuating electrical correction means of the thrust delivered by said thermal thrusters, so as to maximize the responsiveness of each thrust system in order to thereby increase or reduce the thrust delivered;

transpose the technical teaching according to the invention to any propulsion device, whether aerial, marine or terrestrial.

To this end, the invention provides for a method for correcting the thrust vector delivered by a thrust unit of a thrust system, the latter also comprising processing means arranged to implement said method. Such a thrust unit comprises a mechanical rotor moved in rotation by a rotary shaft of an internal combustion engine in response to a power command.

Such a method comprises iteratively:

a step of converting a thrust command into a rotation speed setpoint of the shaft of the internal combustion engine of the thrust unit;

a step of producing an error value between said rotation speed setpoint and the measured rotation speed of said shaft, by a measurement sensor cooperating with said internal combustion engine and with said processing means;

a step of generating the power command based on said error value between said rotation speed setpoint and the measured rotation speed of the shaft of said internal combustion engine so as to reduce said error value and thus control the speed of the internal combustion engine;

In order to propose a thrust system combining operational range with respect to energy, power and responsiveness:

the thrust system also comprises electrical correction means of the thrust vector delivered by said thrust unit;

said method comprises an iterative step, independent of said speed control of the rotation of the shaft of the internal combustion engine, of generating an actuation command of said electrical correction means of the thrust vector based on said error value between the rotation speed setpoint and the measured rotation speed of the shaft of the internal combustion engine.

According to a preferred embodiment, the step of generating the power command can consist of producing said power command by multiplication, integration and/or derivation of said error value between said rotation speed setpoint and the measured rotation speed of said shaft.

In order to maintain a minimum power delivered by the thrust unit independently of the thrust setpoint, such a method can comprise a step of correcting the power command generated so that such a power command is not less than a minimum power command threshold.

Correspondingly, in order to limit the power delivered by the thrust unit independently of the thrust setpoint, a method according to the invention can comprise a step of correcting the power command generated so that such a power command does not exceed a maximum power command threshold.

According to one of these two latter variants, in order to make it possible to modify dynamically such minimum and/or maximum command thresholds, a method according to the invention can comprise a step of taking account of a lower or upper limit setpoint of the thrust of the thrust unit and of initialization of a minimum or maximum command threshold.

According to an advantageous embodiment, the step of actuating the thrust vector correction means can consist of generating the actuation command of said thrust vector correction means by multiplication, integration and/or derivation of said error value between said rotation speed setpoint and the measured rotation speed of the shaft of the internal combustion engine.

According to a second subject, the invention relates to a computer program product comprising one or more program instructions capable of being interpreted by processing means of a computer, said program instructions being capable of being loaded in a non-volatile memory thereof, characterized in that the execution of said instructions by said processing means causes the implementation of a thrust vector correction method according to the invention.

According to a third subject, the invention relates to a computer-readable storage medium comprising the instructions of such a computer program product.

According to a fourth subject, the invention relates to a thrust system comprising a thrust unit, electrical correction means of the thrust vector delivered by said thrust unit, processing means arranged to implement a thrust vector correction method according to the invention.

According to a first embodiment of such a thrust system, the thrust unit can comprise:

a rotary-shaft internal combustion engine the rotation speed of which is a function of the power command generated by the processing means;

a mechanical rotor moved in rotation by said internal combustion engine.

In this case, the electrical correction means of the thrust vector can comprise:

a rotary-shaft electric motor the rotation speed of which is a function of the actuation command of said correction means generated by the processing means;

a mechanical rotor moved in rotation by said electric motor and delivering an additional thrust vector substantially parallel to the thrust vector delivered by the thrust unit.

According to this first embodiment of such a thrust system, the latter can also comprise a motor-generator mutually coupled with the internal combustion engine of the thrust unit in order to convert all or part of the mechanical power delivered by said internal combustion engine into electrical power delivered by said motor-generator according to an actuation command of said motor-generator generated by the processing means.

The invention provides for a second embodiment of a thrust system according to which:

the thrust unit can comprise a turbojet having a fluid discharge outlet;

the electrical correction means of the thrust vector can comprise:

a pair of deflector guides mounted in rotation and mutually arranged to deflect, downstream of the fluid discharge outlet, all or part of the thrust vector of the thrust unit in one or more directions substantially normal to the direction of said thrust vector at the fluid discharge outlet of the turbojet;

electric actuators arranged to interpret the actuation command and to cause respectively a rotation of the deflector guides.

According to a fifth subject, the invention relates to a propulsion device comprising at least one thrust system according to the invention, said propulsion device comprising navigation control means arranged to generate a thrust command capable of being interpreted by the processing means of said at least one thrust system.

In order to confer on an aerial propulsion device a vertical take-off and landing capability, the latter can comprise a platform arranged to receive a load, support means of the thrust unit of said at least one thrust system, said support means being arranged to orient the thrust vector of said thrust unit in a direction substantially normal to the platform.

Advantageously, in order to maintain a minimum power or limit the power delivered by said at least one thrust unit of a thrust system according to the invention, the navigation controller means can be arranged to generate a lower or upper limit setpoint of the thrust of the thrust unit of said at least one thrust system.

In order to shelter or preserve the integrity of the load carried, a propulsion device according to the invention can comprise a fairing associated with the platform arranged to protect said load from the environment of said propulsion device.

Other characteristics and advantages will become more clearly apparent on reading the following description and on examination of the accompanying figures, among which:

FIG. 1, already described, shows a first known propulsion device, arranged to provide a substantially vertical take-off and landing capability;

FIG. 2, already described, shows a second known propulsion device, arranged to provide a substantially vertical take-off and landing capability;

FIG. 3, already described, shows the arrangement of a thrust system of such a second known propulsion device shown in FIG. 2;

The invention will be described firstly through an embodiment example of a particularly innovative thrust system TSa as depicted by way of non-limitative example in FIG. 4. The thrust vector correction method, such as the method 100 shown in FIG. 6, implemented by such a thrust system TSa can nevertheless be used and transposed to correct the thrust vector of other propulsion device thrust systems, such as the thrust systems shown in FIGS. 1, 2 and 3, after adaptation thereof. Such transpositions will be considered hereinafter, with reference to FIGS. 7 and 8.

Figure 4:
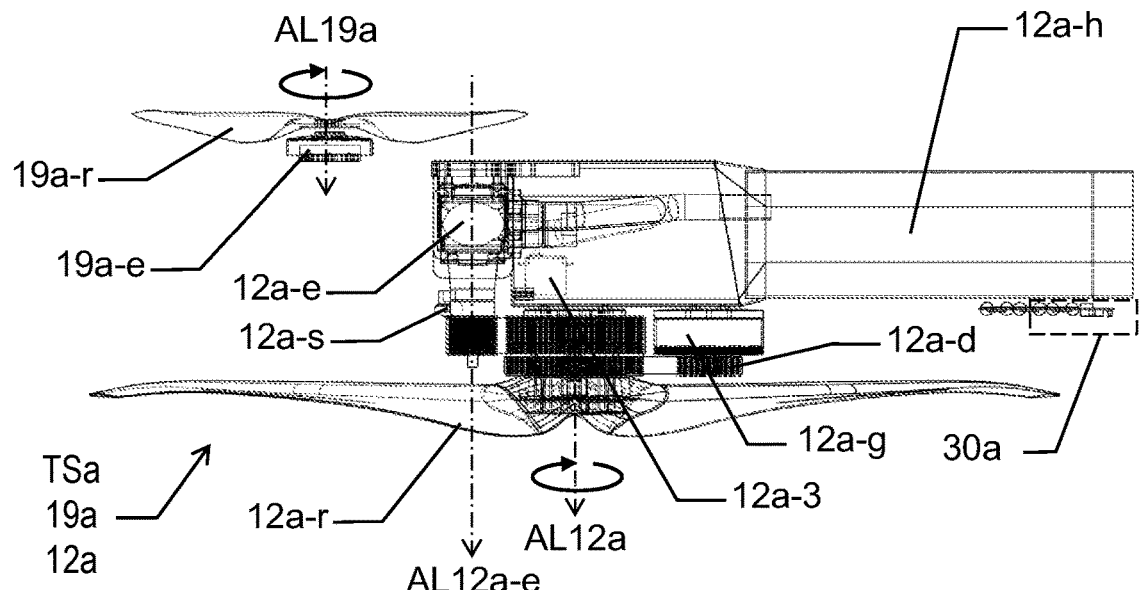
FIG. 4 shows a non-limitative embodiment example of a thrust system of an aerial propulsion device according to the invention.
Figure 5:
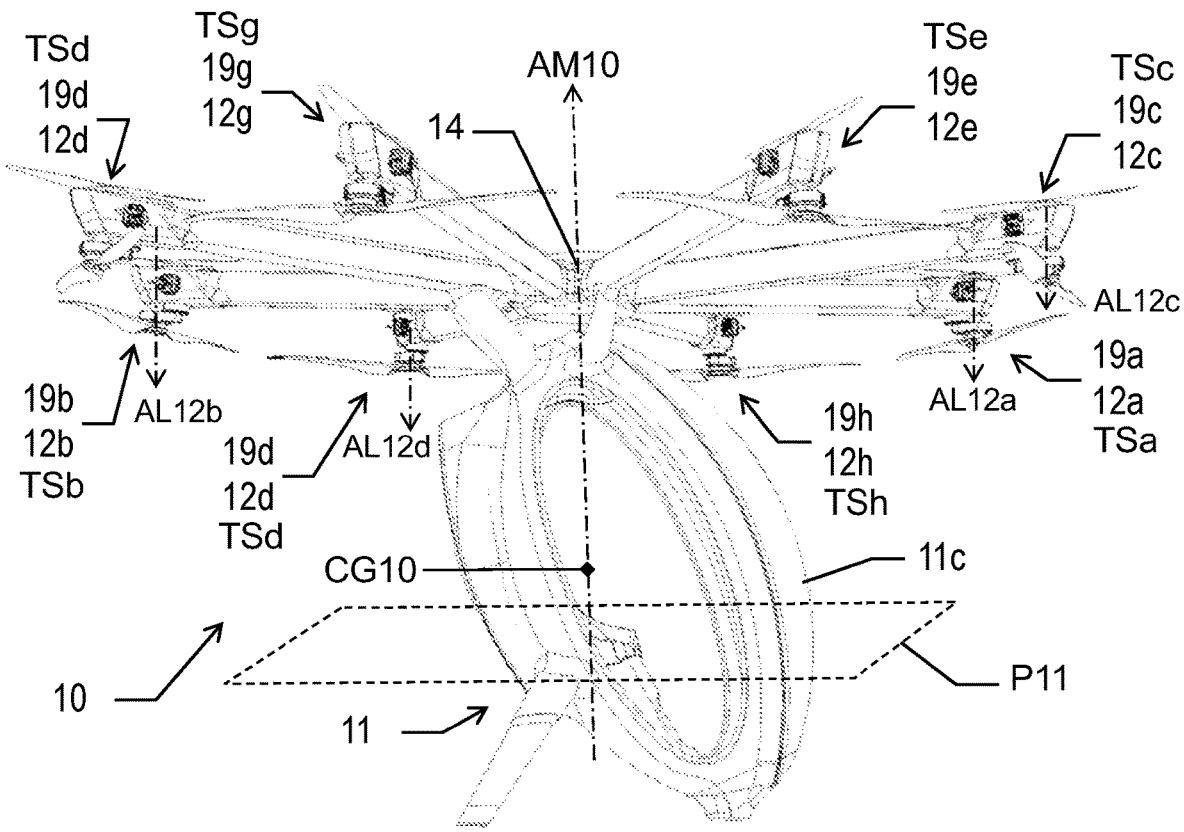
FIG. 5 shows an example of a propulsion device according to the invention, in the advantageous form of an octocopter arranged to carry mainly a human passenger.

A thrust system TSa depicted in FIG. 4 makes it possible to equip an aerial propulsion device 10, an example of which is shown in FIG. 5. The latter comprises a platform 11, which for the sake of simplicity can be diagrammatically represented by, or reduced to, a plane P11 that is substantially horizontal when the propulsion device 10 is placed on the ground or on a horizontal support. According to FIG. 5, said platform 11 comprises an ovoid fairing 11c for protecting from the environment the load carried by such an aerial propulsion device 10, in this case a human passenger, not shown in said FIG. 5. Any other configuration of the platform 11 (or of the equivalent plane P11) and/or of its fairing 11c could be used instead, in order to fit within the transport application in question or according to the type of payload it is desired to move. The aerial propulsion device 10 comprises support means 14 describing eight arms in the shape of a star, facing one another in pairs. Said arms 14 are inscribed within one and the same plane, substantially parallel to the plane P11 symbolizing the platform 11, above this. Each arm 14 holds a thrust system TSa, TSb, TSc, TSd, TSe, TSf, TSg, TSh, comprising mainly, as will be considered with reference to FIG. 4, a thrust unit 12a, 12b, 12c, 12d, 12e, 12f, 12g, 12h associated with means 19a, 19b, 19c, 19d, 19e, 19f, 19g, 19h for correcting the thrust vector delivered by said thrust unit. Thus, the propulsion device 10 is moved by eight thrust systems TSa to TSh respectively comprising eight thrust units 12a to 12h respectively associated with eight means 19a to 19h for correcting thrust vectors generated by said thrust units. For the sake of simplicity, FIG. 5 shows only the thrust vectors AL12a, AL12b, AL12c, AL12d respectively generated by the thrust units 12a, 12b, 12c and 12d. Said arms 14 can also embed additional elements necessary to the operation of said thrust units 12a to 12h and means 19a to 19h for correcting thrust vectors respectively supported by them. As additional elements, there may be mentioned, by way of non-limitative examples, exhaust assemblies for the waste gases generated by the internal combustion engines of the thrust units, batteries or supercapacitors delivering the electrical energy necessary for the thrust vector correction means and/or electronic processing means of said thrust systems, the fossil fuel supply pipes of the internal combustion engines, the electrical wiring, etc. As shown in FIG. 5, the thrust systems are held by the support arms 14 such that the respective thrust units can deliver thrust vectors substantially normal to the plane P11. In this way, the propulsion device 10 is advantageously configured to provide vertical take-off and landing.

FIG. 4 depicts a first preferred example of a thrust system TSa comprising a thrust unit 12a and means 19a for correcting a thrust vector AL12a generated by said thrust unit 12a.

According to this first embodiment, the thrust unit 12a comprises a rotary-shaft internal combustion engine 12a-e, in this case in FIG. 4 a two-stroke engine, the rotation speed of the shaft or engine speed of which is a function of a power command.

A two-stroke engine comprises one or more pistons that are displaced in the same number of cylinders, in this case two, according to the example shown in FIGS. 4 and 5, and perform a full combustion cycle in only two linear movements. The linear displacement of a piston in a cylinder makes it possible to exhaust burned gases and to refill said cylinder with fresh gas or mixture consisting of a fuel vapour and an oxidizing agent (air) via a valve unit. The displacement cycle of such a piston within the cylinder that houses it can be summarized as follows. A first step called "expansion", while the piston occupies a high position within the cylinder, consists of a spark plug causing the combustion of said mixture, driving the piston which compresses said mixture present in a crankcase below said piston. This is the power part of the cycle, the remainder of the stroke of said piston within said cylinder being due to the inertia of a crankshaft created by said expansion. During the descent of the piston in the cylinder, the intake of the mixture in the crankcase is closed. When arriving close to a bottom dead centre, the piston uncovers the ports for exhaust and transfer of mixture into the cylinder. On entering the cylinder, the mixture expels the combustion gases. This is the step called "inlet/exhaust". On its upward return, the piston compresses the mixture in the cylinder, while closing the exhaust and the inlet for mixture into the cylinder. A negative pressure is thus created in the crankcase and will make it possible for said mixture to arrive in said crankcase through an inlet port. This step is called "compression". A new cycle can be started. In order to regulate the engine speed, a throttle valve regulates the amount of air inlet into the mixture, by means of a carburetor. In order to open or close such a throttle valve, an actuator 12a-3 is utilized. The further said throttle valve is opened, the faster the engine speed, the further said throttle valve is closed, the engine speed decreases until it is idling. Within the context of the invention, a power command PC can be generated and translated by such an actuator 12a-3 of the throttle valve. It can consist of a servomotor or an electric cam motor, the stroke of which involves progressive opening or closing of said throttle valve.

According to FIG. 4, the rotary-shaft internal combustion engine 12a-e moves a mechanical rotor 12a-r in rotation, the latter being coupled to the rotary shaft of the internal combustion engine. As shown in FIG. 4, such a coupling can be produced indirectly by a reduction gear means 12a-d, for example by means of a belt cooperating with a first pulley, fixed on the rotary shaft of the motor 12a-e, and a second pulley having a greater diameter than that of the first pulley, fixed on the shaft of said rotor 12a-r. Such a coupling can be produced by any other structurally different means providing an equivalent function, such as a gearbox for example, for dynamically regulating the reduction ratio of the rotation speed of the rotary shaft of the internal combustion engine 12a-e. FIG. 4 also shows processing means 30a, capable of being connected by a terminal so that these latter can be physically remote from the structural elements of the thrust system, in order to implement a method for correcting the thrust vector AL12a delivered by the thrust unit 12a of the thrust system TSa. Such a method will be described with reference to an example 100 shown with FIG. 6, in order to generate in particular the power command PC capable of being interpreted by the actuator 12a-3 of the throttle valve of the internal combustion engine 12a-e. FIG. 4 shows moreover the exhaust means 12a-h for discharging the gases burned by said internal combustion engine 12a-e.

Said processing means 30a can advantageously be in the form of one or more microcontrollers or microprocessors. This or these latter work(s) together in particular with a data memory in order to store or read the data generated by the implementation of said thrust vector correction method as well as operating parameters, or more generally all data generated or stored beforehand, whether they consist of intermediate data or results relating to actuator commands. Such processing means 30a also comprise a program memory for storing instructions of a computer program the execution of which causes the implementation of processes, including the thrust vector correction method according to the invention. By "data or program memory" is meant any volatile, or advantageously non-volatile, computer memory. A non-volatile memory is a computer memory the technology of which makes it possible to retain its data in the absence of an electrical power supply. It can contain data resulting from inputs, calculations, measurements and/or program instructions. The main non-volatile memories currently available can be written to and/or erased electrically. They rely on the EPROM ("erasable programmable read-only memory"), EEPROM ("electrically-erasable programmable read-only memory"), flash, SSD ("solid-state drive") technologies, etc. The "non-volatile" memories are distinguished from the memories known as "volatile", the data of which are lost in the absence of an electrical power supply. The main non-volatile memories currently available are of the RAM ("random access memory" also known as "read-write memory"), DRAM (dynamic RAM, requiring a regular refresh), SRAM (static RAM, requiring such a refresh when there is an insufficient power supply), DPRAM or VRAM (particularly suitable for video), etc. In the remainder of the document, a "data memory" can be volatile or non-volatile.

In order to modify the amplitude or the force of the thrust vector AL12a generated by the actuation of the rotor 12a-r, FIG. 4 shows the correction means 19a of said thrust vector AL12a. These latter consist of a rotary-shaft electric motor 19a-e the rotation speed of which is a function of an actuation command generated by the processing means 30a. Such an electric motor 19a-e is arranged to cooperate with a mechanical rotor 19a-r and to move it in rotation. In this way, the latter creates an additional thrust vector AL19a substantially parallel, or even coaxial, with the thrust vector AL12a delivered by the thrust unit 12a, more precisely the rotor 12a-r. Advantageously, the two rotors 12a-r and 19a-r are jointly mounted in rotation, i.e. they are moved in rotation in one and the same direction, clockwise or anti-clockwise. The support means 14 of the thrust system TSa, not shown in FIG. 4, can be arranged so that the two rotors 12a-r and 19a-r are off-axis to one another, i.e. not merged. For example, the rotor 19a-r can advantageously be off-centre so that the thrust vector AL19a generated thereby is distanced from an axis AM10 normal to a platform 11 passing through the centre of gravity CG10 of an aerial propulsion device such as the device 10 described with reference to FIG. 5, like the thrust vector AL12a of the propulsion device 10 described with reference to FIG. 1. Conversely, the thrust vector AL12a delivered by the rotor 12a-r can advantageously be closer to such an axis AM10, like the thrust vector AL12a of the device 10 described with reference to FIG. 1. This arrangement makes it possible to reduce all interactions or disturbances of the streams mutually generated by the two rotors 12a-r and 19a-r when these latter are substantially coaxial. The invention is not to be considered limited by these examples alone of the mutual arrangement of said two rotors 12a-r and 19a-r.

According to the first embodiment of a thrust system TSa according to FIG. 4, the latter can also comprise a motor-generator 12a-g, the latter being coupled to the internal combustion engine 12a-e of the thrust unit 12a in order to convert all or part of the mechanical power generated by said internal combustion engine 12a-e into electrical power delivered by said motor-generator 12a-g.

As shown in FIG. 4, the internal combustion engine 12a-e is mechanically coupled to such a motor-generator 12a-g. To this end, the rotor of said motor-generator 12a-g is coupled, for example fixed by an embedded-type connection, to the rotary shaft of the internal combustion engine 12a-e. In a variant, such a mechanical coupling between the internal combustion engine 12a-e and the motor-generator 12a-g could be indirect. Thus, said motor-generator 12a-g could cooperate by a belt drive with said rotary shaft of the internal combustion engine, or even with the shaft of the mechanical rotor 12*a*-*r* moved by said internal combustion engine 12*a*-*e*. Such a motor-generator 12*a*-*g* can be electrically connected to an electronic speed converter or regulator (electronic speed control or ESC), which behaves, schematically, like a variable impedance in response to an actuation command. In this way, in accordance with an actuation command, said motor-generator 12*a*-*g* can act as a brake or retarder, progressive or even severe and sudden, of the rotation speed of the shaft of the internal combustion engine 12*a*-*e* and thus reduce the force of the thrust vector AL12*a*. In fact, at high impedance, any electromagnetic field between the stator and the rotor of the motor-generator 12*a*-*g* is cancelled or weak, generating no resistance to the rotation of the rotor of the motor-generator. Conversely, at low impedance, the current induces a strong electromagnetic field between the stator and the rotor of the motor-generator 12*a*-*g*, tending to slow the relative rotation speed between said stator and rotor of the motor-generator 12*a*-*g*, and consequently, the speed of the rotary shaft of the internal combustion engine 12*a*-*e*. This can then be described as an "electrically-controlled variable braking" achieved by the motor-generator 12*a*-*g* on the shaft of the internal combustion engine 12*a*-*e*, such braking being a function of an actuation command generated by the processing means 30*a*. According to an advantageous embodiment, the converter or ESC can be bidirectional in order to allow the injection of a current entering said motor-generator 12*a*-*g* so that the latter no longer behaves as a current generator or alternator but as an electric motor or starter. In this way, the processing means 30*a* can easily cause the start-up of the internal combustion engine 12*a*-*e*, electronically.

Figure 6:
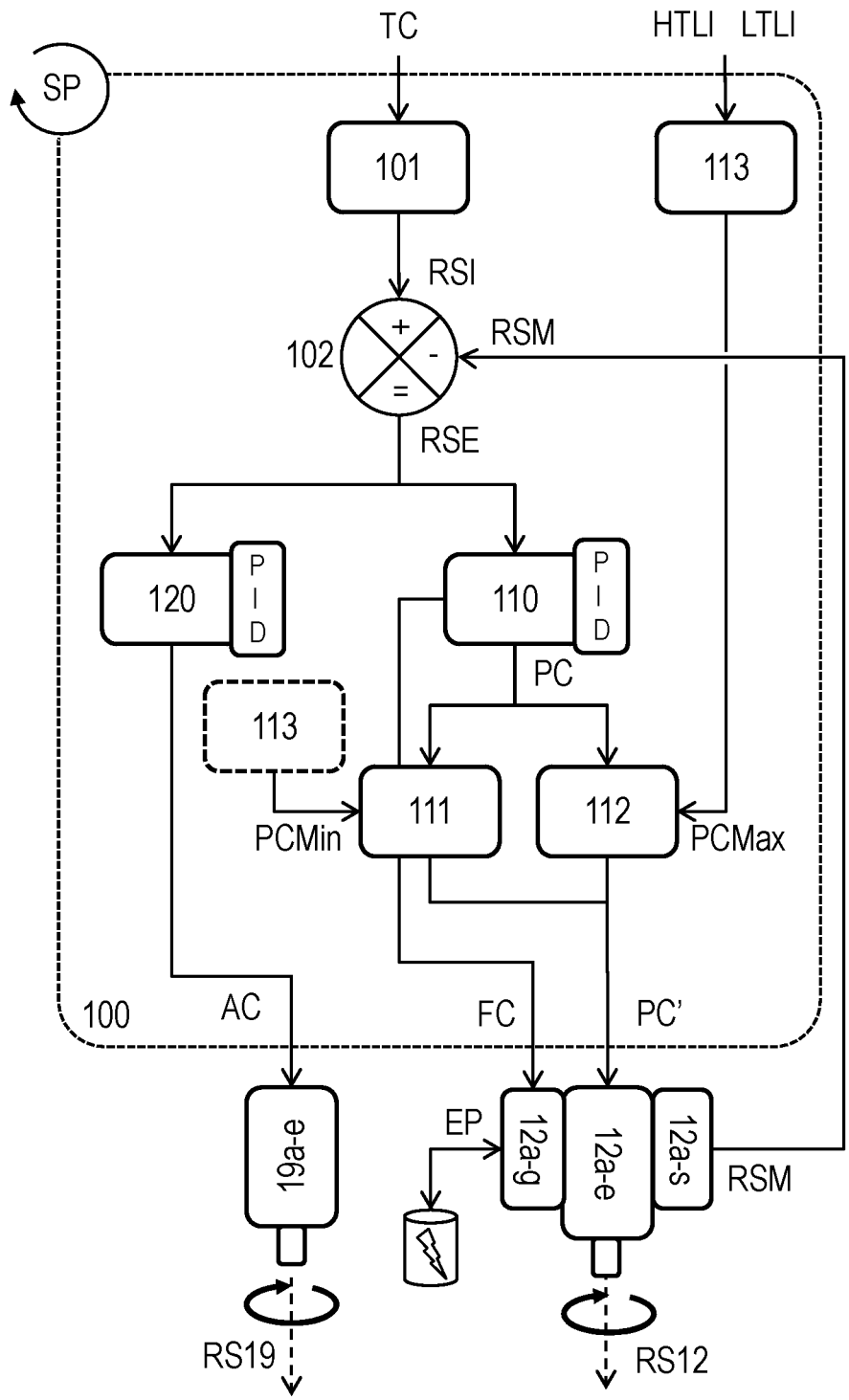
FIG. 6 shows a first example of a functional depiction of a thrust vector correction method according to the invention.

In order to actuate such a thrust system TSa, the invention provides for an advantageously decentralized implementation (i.e. each thrust system comprises processing means 30*a* arranged for this purpose), of a thrust vector correction method 100 as shown by way of preferred but non-limitative example in FIG. 6.

The known thrust systems, for example those already described with reference to FIGS. 1, 2 and 3, comprise main internal combustion thrusters 12*a*1, or even thrust units 12*a*, 12*b* optionally comprising several internal combustion thrusters 12*a*1. These latter are controlled jointly or individually, directly in a centralized manner by an electronic navigation controller 30. This latter generally consists of one or more microprocessors executing program instructions to cause the implementation of a navigation control method. Moreover, such thrust systems comprise attitude correction means triggered automatically in response to control instructions and/or data delivered by an inertial unit, so as to stabilize an attitude of an aerial propulsion device, generally independently of the power developed by the internal combustion thrusters. Some known electronic navigation controllers 30 cause the aerial propulsion device 10 to rise, the latter describing an uncertain or somewhat unstable attitude, by firstly actuating the internal combustion thrusters of the thrust unit or units. As the precision and the responsiveness of these latter are quite limited, electric attitude correction means are then triggered by the electronic navigation controller 30 to try to compensate for a power deficit or delay of one thrust unit or another, within the limit of the capabilities of said correction means, even if said electronic navigation controller 30 again acts to increase or reduce the power of one thrust unit or another if the attitude correction proves insufficient. In view of the low responsiveness and precision, mentioned above, of the internal combustion thrusters of said thrust units, such a fresh adjustment of the power of these latter inevitably causes new attitude corrections, to be "fixed" or attenuated by the electrical correction means within the limit of their capabilities, and so on and so forth.

A thrust system according to the invention is distinguished from the prior art in several ways.

Firstly, the electronic processing means 30*a* specific to said thrust system such as the system TSa shown in FIG. 4, are arranged to implement a thrust vector correction method of a thrust system such as the method 100 shown in FIG. 6. This latter consists of analyzing thrust commands TC originating from an electronic navigation controller 30 in order to translate these latter into power commands PC, PC' of the thrust unit or units comprised within said thrust system TSa. The "translation" aspect is important because the power developed by a two-stroke or four-stroke thermal engine is not controlled identically to that developed by a turbojet. There is therefore a decentralization of the implementation of the processing of the thrust commands TC generated by an electronic navigation controller 30 so that this latter is no longer required to generate specific power commands PC, PC', in view of the variability of the composition or design of the thrust systems.

In a variant, the invention provides for the processing means 30*a* specific to a thrust system to be able to be merged with those 30 implementing the navigation control program. However, even though the electronic means (microprocessors, memories) are shared and/or constitute a single physical entity, the design of the navigation control method can rely on libraries specific to one thrust system or another, encoding program instructions translating a thrust vector control method 100 such as the one shown in FIG. 6. The design of the electronic navigation controller 30, or of the program translating the navigation control method implemented by the latter, is simplified thereby and becomes interoperable or independent of the technology of the thrust systems.

A thrust vector control method according to the invention, such as the method 100 shown in FIG. 6, is also distinguished from the state of the art in that it causes the implementation of a rotation speed control of the shaft of the internal combustion engine or engines 12*a*-*e* of a thrust unit 12*a*.

The aim of such a control is for the rotation speed RSM of the shaft of the internal combustion engine 12*a*-*e* to reach a setpoint value RSI as rapidly as possible, then to maintain this, regardless of the possible external disturbances. To this end, a method 100 according to the invention comprises a first step 101 for translating a thrust command TC, originating from a navigation controller, into a rotation speed setpoint RSI of the shaft of the internal combustion engine. Such a step 101 can consist of implementing a predetermined function according to the intrinsic characteristics of the internal combustion engine, describing such a conversion of a thrust command TC, for example expressed in kilograms of thrust, into a rotation setpoint RSI expressed in revolutions per minute.

Such a method 100 also comprises a step 102 for comparing said rotation speed setpoint RSI and the measured rotation speed RSM of said shaft of the internal combustion engine 12*a*-*e*, by a measurement sensor (referenced 12*a*-*s* in FIG. 4, although not explicitly visible in said FIG. 4) cooperating with said internal combustion engine 12*a*-*e* and with said processing means 30 or 30*a*. Such a sensor can consist of an incremental encoder or code wheel fixed on said shaft or any other sensor suitable for delivering such a measurement, for example a Hall-effect sensor, optical or Foucault currents-based sensor. The step 102 then consists of producing an error value RSE between said rotation speed setpoint RSI and said measured rotation speed RSM of said shaft of the internal combustion engine 12a-e.

The method 100 now comprises a step 110 of generating the power command PC of the internal combustion engine 12a-e of the thrust unit 12a. Such a step 110 is arranged to reduce said error value RSE between said rotation speed setpoint RSI and the measured rotation speed RSM of said shaft of the internal combustion engine 12a-e and thus make it possible to correct the rotation speed of the internal combustion engine 12a-e. More specifically, such a power command PC is intended to be interpreted, according to the arrangement of the thrust system TSa shown in FIG. 4, at the actuator 12a-3 of the inlet throttle valve of the two-stroke engine 12a-e, modifying the speed of said engine.

Such a power command PC can be generated in step 110 by multiplication, integration and/or derivation of the error value RSE between said rotation speed setpoint RSI and the measured rotation speed RSM of said shaft. Such a step 110 then results in the implementation of an algorithm, known by the term "PID corrector", acronym for "proportional, integral, derivative". Said command PC can thus be calculated as being proportional to the error value RSE, it being possible to associate the latter with a first factor or multiplicative gain, for example comprised between one twentieth and one fiftieth, or any other suitable value. In a variant or in addition, said error value RSE can be integrated and divided by a second factor or gain in order to generate said power command PC. Finally, in a variant or in addition, such an error value RSE can be derived and multiplied by a third factor or gain. In this way, said power command PC can be proportional to the error value RSE and/or take account of the variation of said error value over time.

Such a method 100 is iterative over a given temporal period SP. Said iteration period, in particular for taking account of the measurements of said sensor of the speed of the rotary shaft of the internal combustion engine 12a-e, is of paramount importance in trying to reduce the error value RSE as quickly as possible over time. Advantageously, it is possible to choose a time period SP comprised between a few milliseconds and a few seconds, for example a period of twenty milliseconds.

A thrust vector control method 100 according to the invention is further distinguished from the prior art in that it comprises, in parallel and independently of the process of speed correction of the shaft of the internal combustion engine (via the iterative implementation of step 110), a step 120 of generating actuation commands AC, of the correction means 19a of the thrust vector of the thrust system, such as the system TSa shown in FIG. 4. The step 120 is arranged to generate, according to the time period SP, actuation commands AC based on the error value RSE between the setpoint speed RSI, taken from step 101, and the measured speed RSM of the shaft of the internal combustion engine 12a-e, said error value RSE being calculated in step 102. The objective of this step 120 is to compensate mainly for the low responsiveness of the internal combustion engine 12a-e during the speed correction thereof without acting on the regulation as such of the rotation speed of the shaft of the internal combustion engine 12a-e. The actuation 120 of the correction means 19a of the thrust vector is therefore independent of the control, as such, of the internal combustion engine. With reference to the example of the thrust system TSa shown in FIG. 4, the invention provides for electrical correction means 19a of the thrust vector AL12a generated by the rotor 12a-r moved by the internal combustion engine 12a-e. Such electrical correction means 19a can advantageously consist of a rotary-shaft electric motor 19a-e driving in rotation a mechanical rotor 19a-r. Such an electric motor 19a-e generally incorporates a converter translating a graduated electrical activation setpoint into a rotation speed RS19 of its shaft. Due to its design, the electric motor 19a-e is much more responsive than the internal combustion engine 12a-e. It can generate a thrust vector AL19a additional to the vector AL12a generated by the rotor 12a-r moved by said internal combustion engine 12a-e. A sudden appropriate actuation of the electric motor 19a-e makes it possible, in an acceleration phase of the engine speed of the internal combustion engine 12a-e, to obtain a thrust vector very rapidly, resulting from the conjunction or combination of the thrust vectors AL12a and AL19a, having an amplitude or force identical to that which a thrust vector AL12a would describe virtually if the internal combustion engine was provided with almost instantaneous response. Of course, during the implementation of the speed control of said combustion engine (step 110), the latter tends to reach the rotation speed setpoint RSI. By virtue of iterative implementation of step 120, the power developed by the electric motor 19a-e decreases under the effect of updating of the actuation command AC which is a function of the error value RSE, until the rotor 19a-r is left "freewheeling", leaving only the rotor 12a-r active, moved by the thermal engine 12a-e. Through the iterative implementation, according to the period SP, of the method 100, the electric motor 19a-e is again put under load as soon as an error value RSE is again positive (i.e. as soon as the rotation speed RS12 of the rotary shaft of the internal combustion engine 12a-e falls below the setpoint speed RSI) and significant (by "significant error value" is meant an error value the absolute value of which causes an actuation of the correction means 19a). Thus, the invention provides for the step 120 to be arranged to generate iteratively an actuation command AC of said correction means 19a-e of the thrust vector by multiplication, integration and/or derivation of the error value RSE between the rotation speed setpoint RSI and the measured rotation speed RSM of the shaft of the internal combustion engine 12a-e. According to a preferred embodiment, emphasis is placed, entirely or majoritarily, on an actuation command obtained proportionally to said error value RSE. The calculation 120 of the actuation command AC can also use a parametric model of the responsiveness of the internal combustion engine 12a-r, so that the thrust vector of the thrust system TSa, resulting from the combination of the thrust vectors AL19a and AL12a generated respectively by the combined rotations of the rotors 19a-r and 12a-r moved respectively by the electric motor 19a-e and the internal combustion engine 12a-e, describe a thrust amplitude that is as constant as possible during the process of speed control of said internal combustion engine and prevents any overcompensation of the thrust vector AL12a.

The implementation of the method 100 thus makes it possible to add an additional thrust vector AL19a to compensate for a slow increase in the amplitude of the thrust vector AL12a generated by the internal combustion engine 12a-e of the thrust unit 12a.

An internal combustion engine, such as a two-stroke or four-stroke engine, further compromises its responsiveness when its engine speed falls below a certain threshold. It is therefore advantageous to keep an engine speed greater than or equal to such a lower limit threshold. To this end, a method 100 according to the invention can comprise a step 113 of taking account of a thrust lower limit setpoint LTLI of the internal combustion engine 12a-e, or more generally of the thrust unit 12a, and generate a minimum power command threshold value PCMin, written to the data memory of the processing means 30 or 30a implementing said method 100. Such a setpoint LTLI can be generated by the electronic navigation controller means 30. In a variant or in addition, such a threshold PCMin can reflect a parameterization at implementation of said method 100, and thus constitute a default or predetermined value written to said data memory. The method 100 then comprises a step 111 consisting of reading, in the data memory of the processing means 30, 30a, the value of such a threshold PCMin describing a limit power command below which the engine speed of the internal combustion engine 12a-e would be too low to retain a satisfactory responsiveness. Said step 111 consists of comparing the power command PC generated in step 110 to the threshold value PCMin, and generating a corrected power command PC' equal to said power command PC generated when the latter is greater than said limit power command PCMin or equal thereto otherwise. The step 111 is thus arranged so that in response to such a power command PC', optionally corrected, the engine speed of the combustion engine 12a-e does not drop below a lower limit threshold.

Correspondingly, the invention provides that the step 113, or in a variant a step dedicated to this purpose, takes account of a thrust upper limit setpoint HTLI of the thrust unit and generation of a maximum power command threshold value PCMax, written to the data memory of the processing means implementing said method 100. Such a setpoint HTLI can be generated by the navigation controller means 30. In a variant or in addition, such a threshold PCMax can reflect a parameterization at implementation of said method 100, and thus constitute a default or predetermined value written to the data memory. A method 100 according to the invention can then comprise a step 112 consisting of reading, in the data memory of the processing means implementing said method (such as the means 30 or 30a), the value of such a threshold PCMax describing a maximum power command. Said step 112 can consist of comparing the power command PC generated in step 110 to the value of said threshold PCMax and generating a corrected power command PC' equal to said power command PC generated when the latter is less than said limit power command PCMax or equal thereto otherwise. The step 112 is thus arranged so that in response to such a power command PC', optionally corrected, the engine speed of the combustion engine 12a-e does not exceed an upper limit threshold. In fact, the higher the engine speed of an internal combustion engine, the greater the noise level that it produces. Such a noise level can be detrimental or unpleasant in the take-off or landing phase of an aerial propulsion device such as the one shown in FIG. 5. On the other hand, the operational noise level of an electric motor, even at high speed, is lower. Limiting the power command PC to an upper threshold PCMax, even though said power command PC generated in step 110 is greater than said threshold PCMax, maintains a positive error value RSE which cannot be compensated for by the control of the internal combustion engine but can be compensated by the actuation of the electric motor 19a-e that corrects the thrust vector under the effect of an actuation command AC proportional to said error value RSE. The rotor 19a-r moved by the electric motor 19a-e then compensates for the deficit of the thrust vector resulting from the thrust system 12a and allows a take-off or landing phase of a propulsion device equipped with said thrust system, at a low noise level. The setpoint HLTI can be cancelled by the navigation controller means 30 when a height or more generally a reasonable navigation distance is reached from the departure location.

The step 112 intended to smooth out the power command PC then ceases to produce its effects, the internal combustion engine returning to a wider range of engine speed.

The invention also makes provision to adapt the step 110 generating the power command PC or, in a variant, to comprise a step distinct from said step 110, to generate an actuation command FC of electrical braking means intended to adjust more rapidly than simply by implementing the iterative step 110 as described above, the rotation speed RS12 of the shaft of said internal combustion engine 12a-e to a lower setpoint speed RSI. Like the acceleration of the engine speed of this engine, the deceleration thereof is not very responsive. According to the embodiment example described with reference to FIG. 4, the thrust unit 12a can comprise a motor-generator 12a-g coupled with the rotary shaft of the internal combustion engine 12a-e in order to convert all or part of the mechanical power developed by said internal combustion engine 12a-e into electrical power EP, the latter being capable of being stored in a battery or a supercapacitor. During control, by iterative generation of actuation commands FC adapted to the electronic converter or speed regulator of the motor-generator 12a-g, an "electrical-control variable braking" is applied by said motor-generator 12a-g to the rotary shaft of the internal combustion engine 12a-e, such a braking being a function of the actuation command FC generated in step 110 thus modified. Like the actuation commands AC the generation 120 of which has been described above, the step 110 can also consist of generating actuation commands FC of the motor-generator 12a-g based on the error value RSE calculated in step 102 between setpoint speed RSI (taken from step 101) and measured speed RSM of the shaft of the internal combustion engine 12a-e. The objective of this modified step 110 consists of compensating for the low responsiveness of the internal combustion engine 12a-e in the deceleration phase and thus contributes to the control process thereof. Due to its design, the electric motor-generator 12a-g is much more responsive than the internal combustion engine 12a-e. It can rapidly slow the rotation of the rotary shaft of the internal combustion engine 12a-e. Of course, during implementation of the speed correction of said combustion engine 12a-e combined with the braking delivered by the motor-generator 12a-g, said combustion engine 12a-e tends to reach the rotation speed setpoint RSI. The braking power developed by the electric motor-generator 12a-g decreases under the effect of updating of the actuation command FC which is a function of the error value RSE, until the rotor 12a-r, moved by the internal combustion engine 12a-e, is released from any hold. By the iterative implementation, according to the period SP, of the method 100, the motor-generator 12a-g is again put under load as soon as an error value RSE is again negative (i.e. as soon as the rotation speed RS12 of the rotary shaft of the internal combustion engine 12a-e exceeds the setpoint speed RSI) and significant (i.e. sufficient in absolute value to cause braking by the motor-generator 12a-g). The invention provides for the step 110, or a step distinct therefrom, to be arranged to generate iteratively an actuation command FC of said electrical braking means 12a-g by multiplication, integration and/or derivation of the error value RSE between the rotation speed setpoint RSI and the measured rotation speed RSM of the shaft of the internal combustion engine 12a-e. According to a preferred embodiment, emphasis is placed, entirely or majoritarily, on an actuation command obtained proportionally to said error value RSE. The calculation 110 of the actuation command FC can also use a model of the responsiveness of the internal combustion engine 12a-r, so that the thrust vector of the thrust system TSa, resulting from the combination of the thrust vector AL12a generated by the rotation of the rotor 12a-r moved by the internal combustion engine 12a-e and the braking operated by the motor-generator 12a-g, describes a thrust amplitude that is as responsive as possible during the process of speed control of the shaft of said internal combustion engine.

A thrust vector correction method 100 according to the invention, shown in FIG. 6, has just been described in the light of a thrust system TSa according to an arrangement shown in FIG. 4 for equipping, for example, an aerial propulsion device 10 such as the one already described with reference to FIG. 5.

A description will now be given, with reference to FIG. 7, of such a thrust vector correction method 100 of a thrust system TSa of an aerial propulsion device 10 such as the one already described with reference to FIG. 1. Such a method 100 is similar to one described with reference to FIG. 6 and comprises, iteratively according to a predetermined time period SP:
- A step 101 of translating a thrust command TC into a rotation speed setpoint RSI of a shaft or rotor moved by an internal combustion engine;
- a step 102 of producing an error value RSE between a rotation speed setpoint RSI and a measured speed RSM of the rotary shaft of said internal combustion engine;
- a step 110 of generating a power command PC, optionally corrected by the implementation of a step 111 or 112, of the internal combustion engine using said error value RSE to control the speed of said engine;
- a step 120 of generating an actuation command of electrical correction means of the thrust vector generated under the effect of the internal combustion engine.

As a reminder, an aerial propulsion device 10, already described with reference to FIG. 1, comprises two thrust systems 12a and 12b, respectively comprising the thrust units 12a, 12b based on turbojets and electrical attitude correction means 19a and 19b, in the form of electric secondary thrusters, in this case electric turbines, delivering thrust vectors substantially normal to a virtual plane P11 describing or symbolizing a platform 11. In order to implement a thrust vector correction method 100 according to the invention, shown in FIG. 7, such an aerial propulsion device 10 needs to be adapted. The first adaptation aims to modify the electronic navigation controller processing means 30 to implant in their program memory the program instructions the execution of which generates the implementation of a method 100, as shown in FIG. 7, for correcting thrust vectors AL12a and AL12b of each of the thrust systems TSa and TSb. In a variant, the processing means specific to each thrust system TSa, TSb, like the means 30a shown in FIG. 4, can be added, in order to implement respectively such a method 100, said processing means specific to the thrust systems cooperating with the navigation controller electronic means 30 to deliver thrust commands TC.

Figure 1:
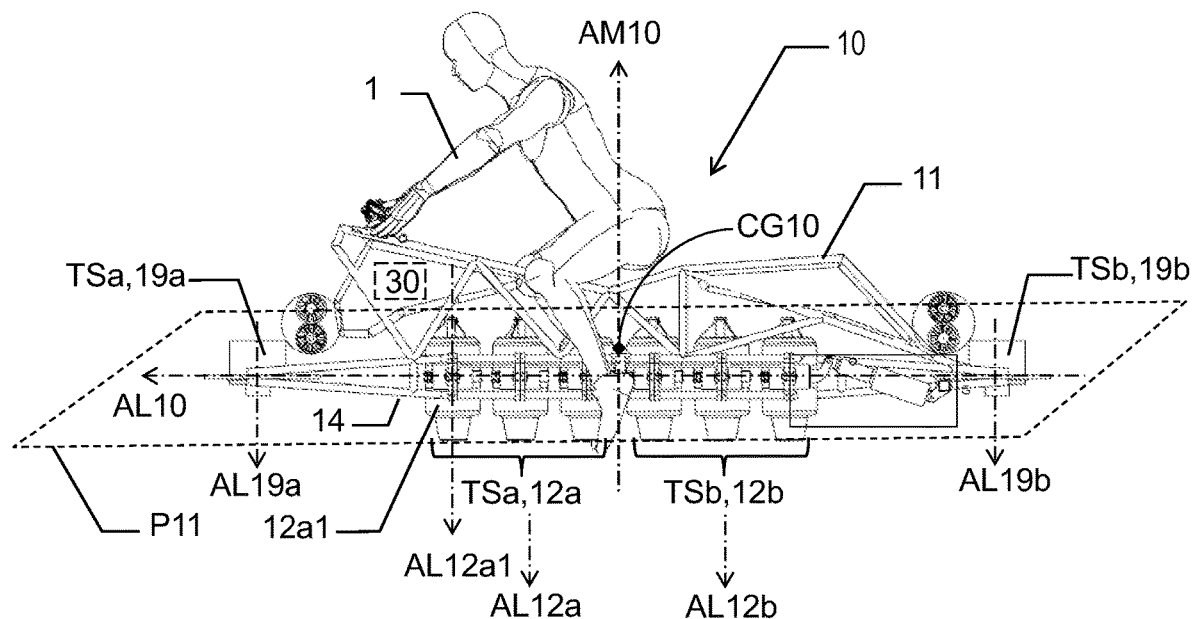

Furthermore, the propulsion device 10 according to FIG. 1 can be adapted to select turbojets incorporating a sensor, such as the sensor 12a-s of the thrust system according to FIG. 4, to measure the rotation speed of the rotors of the turbojets. A single rotation speed measurement sensor can be used per thrust unit 12a or 12b, the latter being coupled, or integrated with, one of the turbojets, such as the turbojet 12a1, when the thrust unit comprises a plurality thereof. In a variant, each thruster or turbojet, or even a plurality, of one and the same thrust unit can be equipped with such a sensor. The step 102 of a method 100 according to FIG. 7 can then consist of producing beforehand an average of the measurements delivered by the sensors associated with the different thermal thrusters of the thrust unit or implementing any other compromise, for example consisting of disregarding certain measurements that are too distant from the others, in order to have available a consolidated measurement RSM of the rotation of the shaft or of the rotor of the thrust unit. The same applies for generating the power command PC or PC' generated by the step 110, optionally corrected by the steps 111 and 112, which can be sent to all of the turbojets of the thrust unit when the latter has several thereof, as in the example shown in FIG. 1.

A description will now be given, with reference to FIG. 7, of how to transpose the teaching of a thrust vector correction method 100 already described with reference to FIG. 6 to a thrust system TSa of a propulsion device 10 according to FIG. 1 thus adapted. For the sake of simplicity, it will be considered that the thrust unit 12a comprises only the turbojet 12a1. The steps of such a method 100 according to FIG. 7 are similar overall to those of the steps of the method 100 according to FIG. 6.

Figure 7:
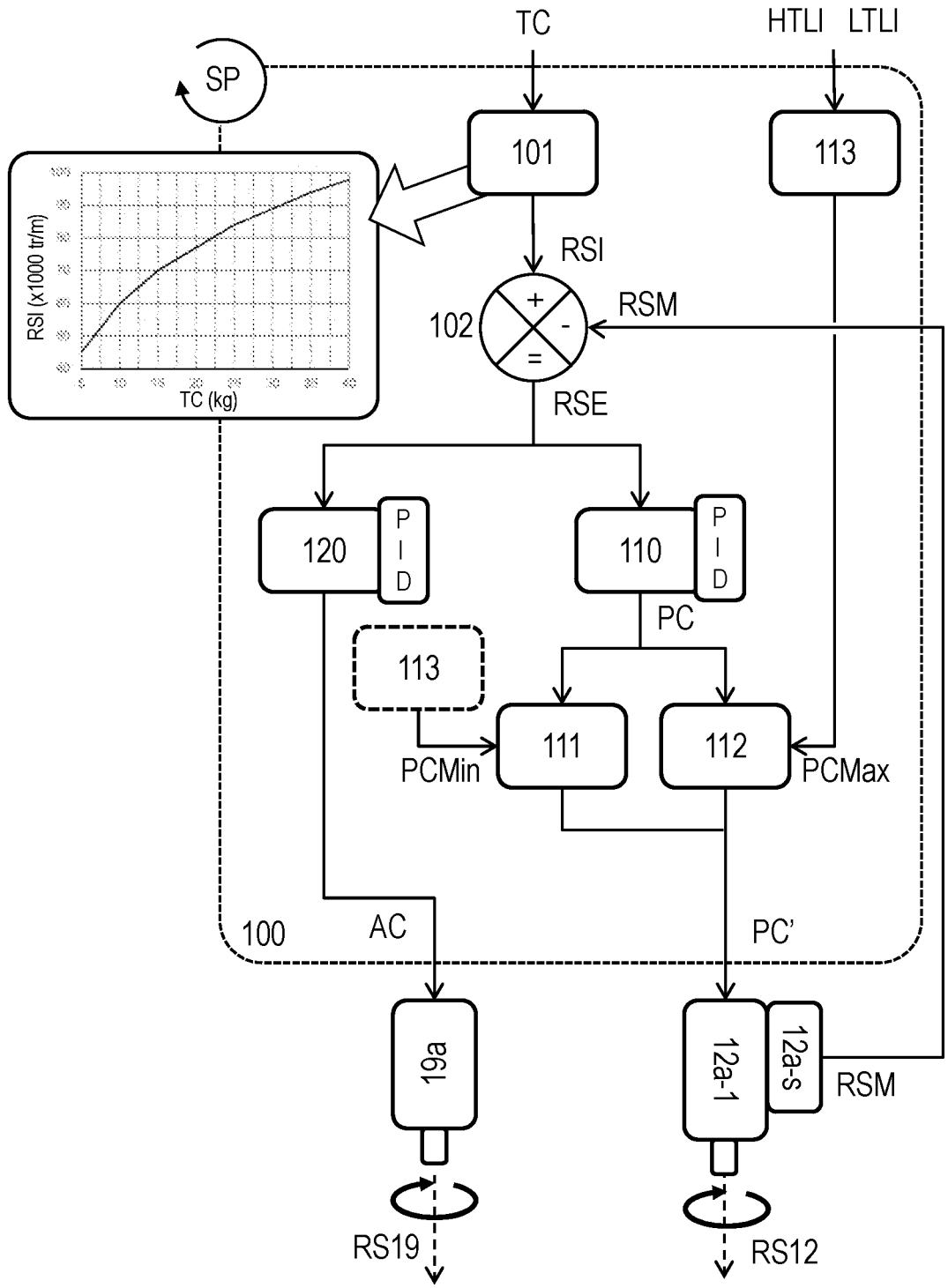
FIG. 7 shows a second example of a functional depiction of a thrust vector correction method according to the invention.

Thus, such a thrust vector control method according to the invention, shown in FIG. 7, is distinguished from the state of the art in that it causes the implementation of a rotation speed control 110 of the rotor of the turbojet 12a1 of the thrust unit 12a. Such a correction aims to make the rotor of said turbojet reach a rotation speed setpoint RSI, as rapidly as possible, and to maintain it, regardless of the possible external disturbances. A method 100 according to the invention thus comprises a first step 101 for translating a thrust command TC, originating from the electronic navigation controller 30, into a rotation speed setpoint RSI of the rotor of the turbojet 12a1 of the thrust unit 12a. By way of example, FIG. 7 thus shows a box with reference to the step 101 describing a curve showing a non-linear conversion model of a thrust command TC expressed in kg and a rotation speed setpoint RSI expressed in thousands of revolutions per minute.

A thrust vector control method 100 according to the invention as shown in FIG. 7 is further distinguished from the prior art in that it comprises, in parallel and independently of the process of speed control of the rotor of the turbojet 12a1 of the thrust unit 12a, i.e. without acting on the regulation as such of said rotation speed of said rotor of said turbojet 12a1, a step 120 of generating actuation commands AC of thrust vector electrical correction means 19a of the thrust system, in this case the electric turbine 19a situated at the nose of the propulsion device 10 depicted in FIG. 1. Like the method 100 shown in FIG. 6, the step 120 of the method 100 shown in FIG. 7 is arranged to generate actuation commands AC based on the error value RSE between setpoint speed RSI, (taken from step 101), and measured speed RSM of the shaft of the internal combustion engine 12a1, said error value RSE being calculated in step 102. The objective of this step 120 is to compensate mainly for the low responsiveness of the turbojet 12a1. With reference to the example of the thrust system TSa shown in FIG. 1, the invention makes provision to use the electric turbine 19a, originally provided to correct the attitude of the propulsion device 10, as corrector, or booster, of the thrust vector AL12a generated by the internal combustion engine 12a1 of the thrust unit 12a during the speed control of the rotor of said turbojet 12a1. Said electric turbine 19a generally incorporates, or is associated with, a converter translating a graduated electrical activation setpoint into a rotation speed RS19 of its shaft. Due to its design, the electric turbine 19a is much more responsive than the turbojet 12a1. It can generate a thrust vector AL19a additional to the vector AL12a delivered by the thrust unit 12a including the turbojet 12a1. A sudden appropriate actuation of the electric turbine 19a makes it possible, in an acceleration phase of the engine speed of the turbojet 12a1, to obtain a thrust vector very rapidly, resulting from the conjunction or combination of the thrust vectors AL12a and AL19a, having an amplitude or force identical to that which a thrust vector AL12a would describe virtually if the turbojet 12a1 was provided with almost instantaneous response. As already explained with reference to the method 100 shown in FIG. 6, the implementation of the speed control of the turbojet 12a1 (step 110) tends to make the latter reach the rotation speed setpoint RSI. The power developed by the electric turbine 19a decreases under the effect of the iterative updating of the actuation command AC that is a function of the error value RSE, until only the turbojet 12a1, or more generally the thrust unit 12a, remains active. By the iterative implementation, according to the period SP, of the method 100, the electric turbine 19a is again put under load as soon as an error value RSE is again positive (i.e. as soon as the rotation speed RS12 of the rotary shaft of the turbojet 12a1 falls below the setpoint speed RSI) and sufficient in absolute value to cause an actuation of the turbine 19a. The invention provides for the step 120 to be arranged to generate iteratively an actuation command AC of the turbine 19a acting as electrical correction means of the thrust vector by multiplication, integration and/or derivation of the error value RSE between the rotation speed setpoint RSI and the measured rotation speed RSM of the shaft of the internal combustion engine 12a1. According to a preferred embodiment, emphasis is placed, entirely or majoritarily, on an actuation command obtained proportionally to said error value RSE. The calculation 120 of the actuation command AC can also use a parametric model of the responsiveness of a turbojet, such as the turbojet 12a1, so that the thrust vector of the thrust system TSa, resulting from the combination of the thrust vectors AL19a and AL12a generated respectively by the electric turbine 19a and the thrust unit 12a, describe a thrust force or amplitude that is as stable as possible during the process of speed control of the internal combustion engines of the thrust unit and prevents any overcompensation of the thrust vector AL12a.

The implementation of the method 100 thus makes it possible to add an additional thrust vector AL19a to compensate for a slow increase in the amplitude of the thrust vector AL12a generated by the turbojet or engines of the thrust unit 12a.

One and the same thrust vector control method 100 can be implemented to correct the thrust vector of the thrust unit 12b of the thrust system TSb of the propulsion device shown in FIG. 1. The power commands PC are generated to regulate the engine speed of the turbojets of the thrust unit 12b. The actuation commands of the thrust vector electrical correction means are generated to regulate the power of the electric turbine 19b positioned at the tail of the propulsion device 10. The electronic navigation controller 30 is responsible for sending the adapted thrust commands TC respectively to the two thrust systems TSa and TSb.

A thrust vector correction method 100 according to the invention, shown in FIGS. 6 and 7, has been described in the light of a first thrust system TSa according to an arrangement shown in FIG. 4, comprising a thrust unit 12a comprising a two-stroke thermal engine driving in rotation a first mechanical rotor 12a-r, said thrust system also comprising means 19a for correcting the thrust vector AL12a, generated by said thrust unit 12a, combining the actuation of an electric motor 19a-e driving in rotation a mechanical rotor 19a-r in order to add to said thrust vector AL12a, and the actuation of a motor-generator to slow the rotation of said first mechanical rotor 12a-r and thus reduce said thrust vector AL12a. Such a thrust vector correction method 100 according to the invention has also just been described in the light of a second example of a thrust system TSa or TSb according to an arrangement shown in FIG. 1, comprising two thrust units 12a, 12b each comprising a plurality of turbojets 12a1, said thrust systems also comprising electrical correction means of the thrust vectors AL12a, AL12b generated by said thrust units 12a, 12b, by the actuation of a nose 19a or tail 19b electric turbine for equipping, for example, an aerial propulsion device 10 such as the one already described with reference to FIG. 1.

The interoperability of a thrust vector correction method according to the invention and delivered by a thrust unit is such, that the latter can perfectly well be used to move an aerial propulsion device such as the device 10 already described with reference to FIG. 2, having four thrust systems TSa to TSd, the thrust system TSa of which is shown in detail in FIG. 3. Such a thrust system TSa is structurally very different to the two previous examples. Nevertheless a thrust vector correction method according to the invention can perfectly well be used.

A description will now be given, with reference to FIG. 8, of such a thrust vector correction method 100 of a thrust system TSa of an aerial propulsion device 10 such as the one already described with reference to FIG. 2. Such a method 100 is similar to the one described with reference to FIG. 6 and comprises, iteratively according to a predetermined time period SP:
  a step 101 of translating a thrust command TC into a rotation speed setpoint RSI of a shaft or rotor moved by an internal combustion engine, in this case a turbojet;
  a step 102 of producing an error value RSE between a rotation speed setpoint RSI and a measured speed RSM of the rotary shaft of said internal combustion engine;
  a step 110 of generating a power command PC, optionally corrected by the implementation of a step 111 or 112, of the internal combustion engine using said error value RSE to correct the speed of said engine;
  a step 120 of generating an actuation command of electrical correction means of the thrust vector generated by the internal combustion engine.

Figure 3:
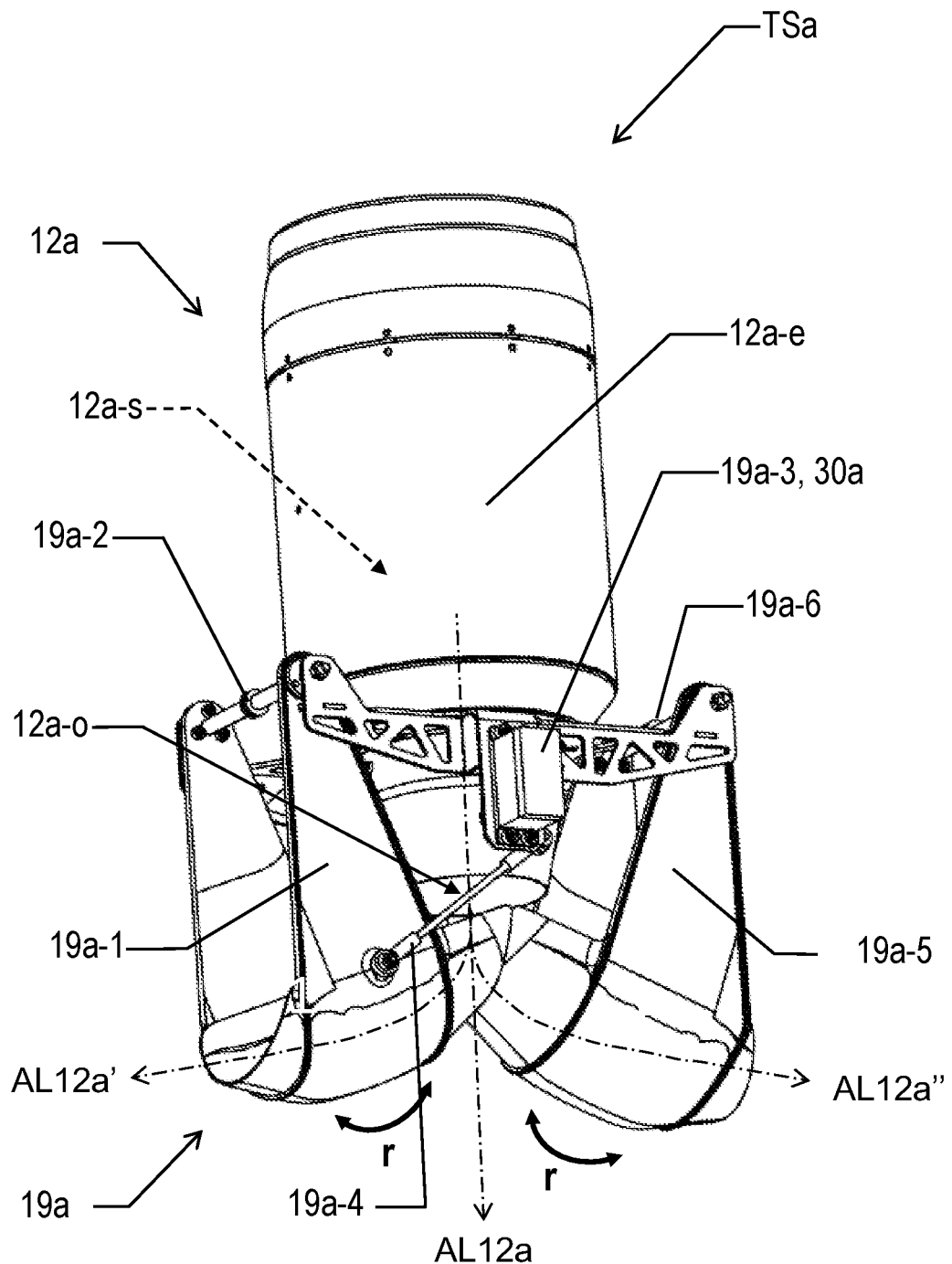

As a reminder, a thrust system 12a shown in FIG. 3 comprises a thrust unit 12a comprising a turbojet 12a-e and thrust vector correction means, in the form of a pair of deflector guides 19a-1, 19a-5 mounted in rotation, in mirror image to one another, and mutually arranged to "pinch" the thrust vector AL12a generated by the turbojet 12a-e downstream of the fluid discharge outlet 12a-o of said turbojet 12a-e. Each guide 19a-1 or 19a-5 is moved in rotation, according to an axis 19a-2 or 19a-6 normal to the thrust vector AL12a, by an electric actuator 19-3 with cam cooperating with said guide via a control rod 19a-4.

Figure 2:
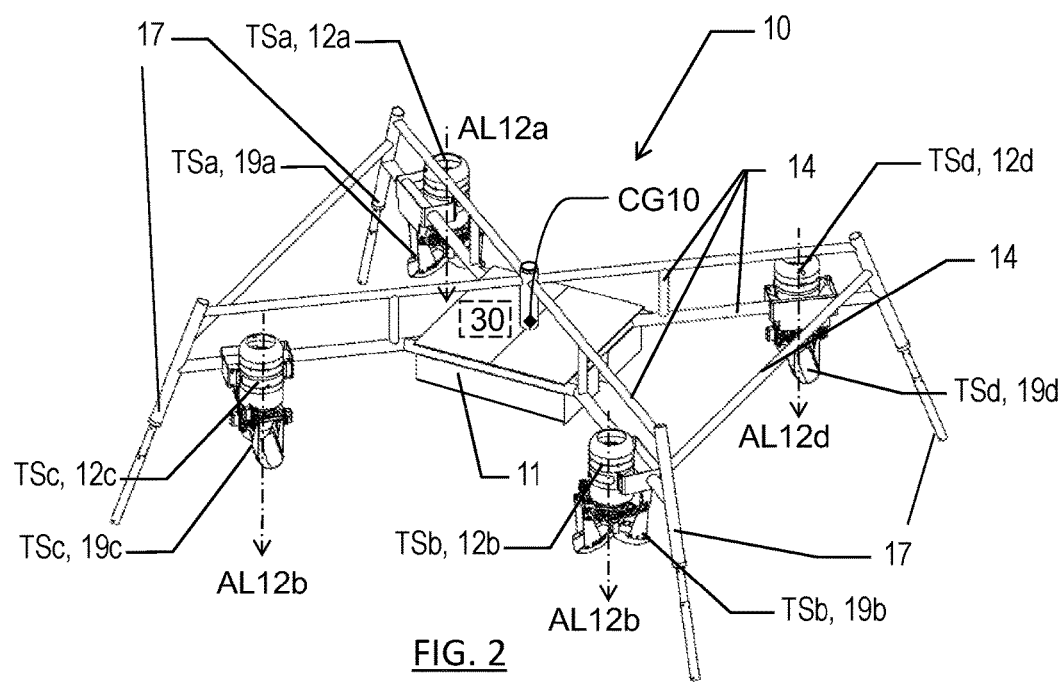
Figure 8:
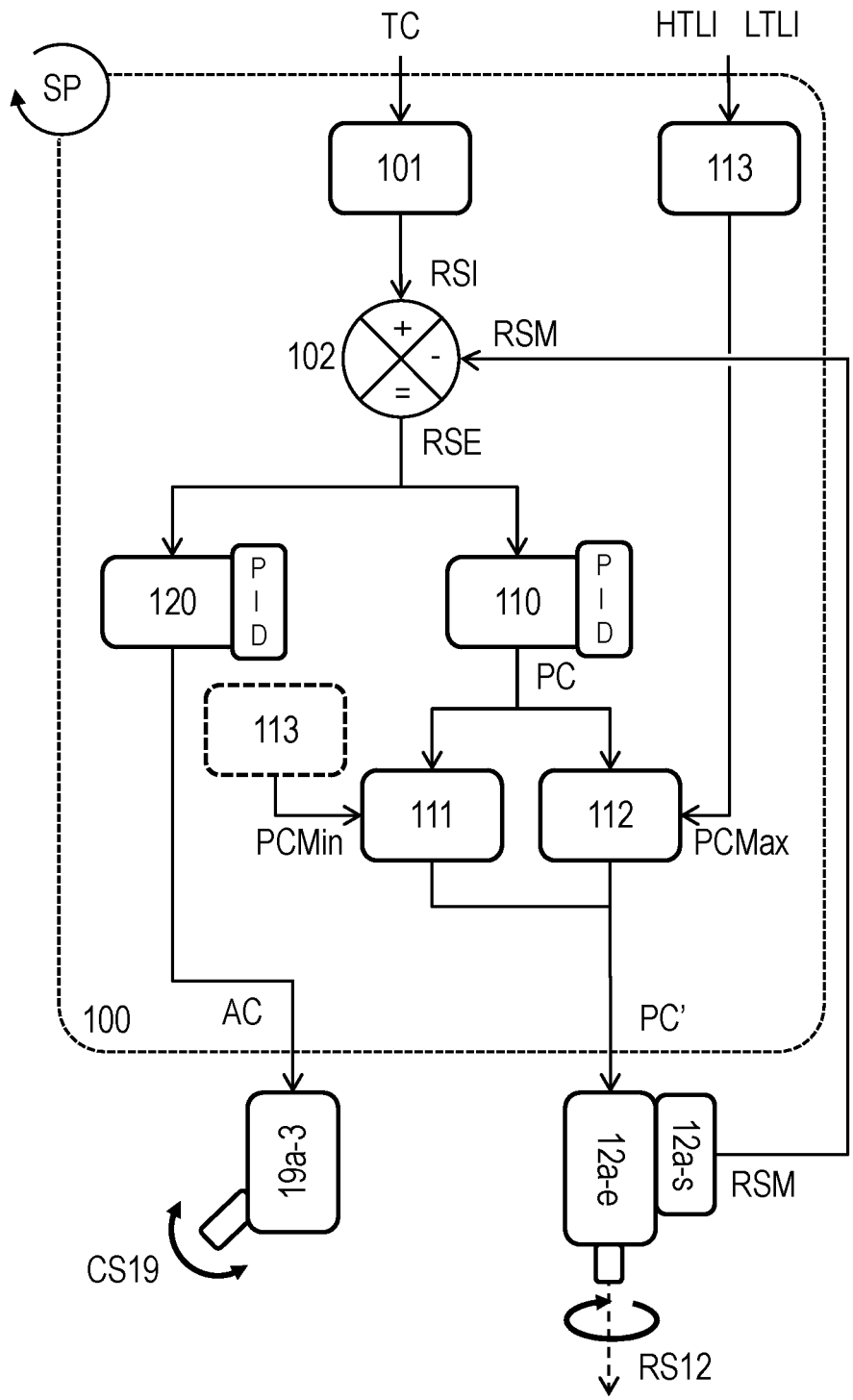
FIG. 8 shows a third example of a functional depiction of a thrust vector correction method according to the invention.

In order to implement a thrust vector correction method 100 according to the invention, shown in FIG. 8, such an aerial propulsion device 10 according to FIG. 2 needs to be adapted. The first adaptation aims to modify the electronic navigation control processing means 30 in order to implant in their program memory the program instructions the execution of which generates the implementation of a method 100, as shown in FIG. 8, for correcting the thrust vectors AL12a to AL12d of each of the four thrust systems TSa to TSd. In a variant, the processing means specific to each thrust system, like the means 30a shown in FIG. 4, can be dedicated to the four thrust systems, in order to implement respectively such a method 100, said processing means specific to the thrust systems TSa to TSd cooperating with the navigation controller electronic means 30 to deliver thrust commands TC.

Furthermore, each thrust system of such a propulsion device 10 according to FIG. 2, the system TSa of which is shown in FIG. 3, can be adapted to add a sensor, such as the sensor 12a-s of the thrust system according to FIG. 4, for measuring the rotation speed of the shaft or of the rotor of the turbojet 12a-e.

There will now be examined, with reference to FIG. 8, how to transpose the teaching of a thrust vector correction method 100, already described with reference to FIG. 6 or 7, to the thrust system TSa of a propulsion device 10 according to FIG. 2 thus adapted.

Like the method 100 described with reference to FIG. 7, the thrust vector control method 100 according to the invention and shown in FIG. 8, is distinguished from the state of the art in that it causes the implementation of a speed control 110 of the turbojet 12a-e of said thrust unit 12a. The aim of such a control is for the rotor shaft of the turbojet 12a-e to reach a rotation speed setpoint value RSI as rapidly as possible, and to maintain this, regardless of the possible external disturbances. A method 100 according to FIG. 8 thus comprises a first step 101 for translating a thrust command TC, originating from the electronic navigation controller 30, into a rotation speed setpoint RSI of the rotor of the turbojet 12a-e of the thrust unit 12a.

A thrust vector control method 100 according to the invention as shown in FIG. 8 is further distinguished from the prior art in that it comprises, during the process of speed correction of the rotor of the turbojet 12a-e of the thrust unit 12a, and independently of said correction process, a step 120 of generating actuation commands AC of thrust vector electrical correction means 19a of the thrust system, in this case the actuator 19a-3 of the deflector guide 19a-1 and/or 19a-5 situated downstream of the fluid discharge outlet 12a-o of the turbojet 12a-e of the thrust system TSa described with reference to FIG. 3. Like the method 100 shown in FIG. 6, the step 120 of the method shown in FIG. 8 is arranged to generate actuation commands AC based on the error value RSE between a setpoint speed RSI, (taken from step 101), and a measured speed RSM of the shaft of the internal combustion engine 12a-e, said error value RSE being calculated in step 102. The objective of this iterative step 120 is to compensate mainly for the low responsiveness of the turbojet 12a-e in parallel with said control process, i.e. without acting on the regulation as such of said rotation speed of the rotor of said turbojet 12a-e. With reference to the example of the thrust system TSa shown in FIG. 3, the invention makes provision to use the deflector guides 19a-1 and/or 19a-5 as correctors of the thrust vector AL12a generated by the internal combustion engine 12a-e of the thrust unit 12a. The electric actuator 19a-3 of said deflector guides generally incorporates, or is associated with, a converter translating a graduated electric activation setpoint into a displacement or stroke CS19 of the cam of said motor 19a-3. Due to its design, the electric actuator 19a-3 is much more responsive than the turbojet 12a-e. It can generate, by "pinching", a reduction in the amplitude of the thrust vector AL12a downstream of the deflector guides 19a-1 and 19a-5, these latter deflecting, wholly or partially, said thrust vector AL12a upstream of said deflector guides 19a-1 and 19a-5, i.e. at the fluid discharge outlet 12a-o. If said deflector guides 19a-1 and 19a-5 are positioned by default to "pinch" said thrust vector AL12a and thus deflect partially, for example of the order of five to twenty-five percent each, the thrust vector AL12a at the fluid discharge 12a-o, it can be considered that an actuation of the motor 19a-3 intended to distance said deflector guides 19a-1 and 19a-5 from said thrust vector AL12a, amounts to increasing said thrust vector AL12a downstream of these latter. Thus it is possible to consider that an actuation, via the electric actuator 19a-3, of the deflector guides 19a-1 and/or 19a-5 can increase, reduce, or even reverse the thrust vector AL12a generated by the turbojet 12a-e downstream of said deflector guides 19a-1 and 19a-5. Thus, a sudden appropriate actuation of the electric cam motor 19a-3 intended to distance from the thrust vector AL12 said deflector guides 19a1 and/or 19a-5 makes it possible, in an acceleration phase of the engine speed of the turbojet 12a-e, to obtain very rapidly a thrust vector of increased amplitude or force downstream of said deflector guides, identical to that which a thrust vector AL12a would describe virtually if the turbojet was provided with almost instantaneous response. As already explained with reference to the method 100 shown in FIG. 6, the implementation of the speed control of the turbojet 12a-e (step 110) tends to make the latter reach the rotation speed setpoint RSI. The stroke of the cam of the electric motor 19a-3 gradually regains its nominal or default position and the deflector guides 19a-1 and/or 19a-5 again "pinch" a part of the thrust vector AL12a generated by the turbojet 12a-e. By the iterative implementation, according to the period SP, of the method 100, the deflector guides 19a-1 and/or 19a-5 are again moved, under the action of the electric motor 19a-3, in order to reduce their "pinching effect" on the thrust vector AL12a as soon as an error value RSE is again positive (i.e. as soon as the rotation speed RS12 of the rotary shaft of the turbojet 12a-e falls below the setpoint speed RSI) and is sufficient in value to cause a new actuation of the motor 19a-3.

Correspondingly, when the error value RSE becomes negative (i.e. as soon as the rotation speed RS12 of the rotary shaft of the turbojet 12a-e exceeds the setpoint speed RSI), an actuation command of the cam motor 19a-3 causes an increase in the pinching of the thrust vector by the deflector guides 19a-1 and/or 19a-5. Thus, in a deceleration phase of the engine speed of the turbojet 12a-e, the invention makes it possible to obtain very rapidly a thrust vector of reduced amplitude downstream of said deflector guides, identical to that which a thrust vector AL12a would describe virtually if the turbojet was provided with almost instantaneous response. As the implementation of the speed control of the turbojet 12a-e (step 110) tends to make the latter reach the rotation speed setpoint RSI, the stroke of the cam of the electric motor 19a-3 gradually regains its nominal or default position, and the deflector guides 19a-1 and/or 19a-5 again "pinch" only a small part of the thrust vector AL12a generated by the turbojet 12a-e, for example ten percent thereof, or any other portion of the thrust vector, advantageously comprised between five and twenty-five percent.

The invention provides for the step 120 to be arranged to generate iteratively an actuation command AC of said electrical correction means of the thrust vector AL12a, in this case the electric motor 19a-3 by multiplication, integration and/or derivation of the error value RSE between the rotation speed setpoint RSI and the measured rotation speed RSM of the shaft of the internal combustion engine 12a-e. According to a preferred embodiment, emphasis is placed, entirely or majoritarily, on an actuation command obtained proportionally to said error value RSE. The calculation 120 of the actuation command AC can also use a model of the responsiveness of a turbojet, so that the thrust vector of the thrust system TSa downstream of the deflector guides describes a thrust amplitude that is as stable as possible during the process of speed correction of the turbojet 12a-e of the thrust unit 12a and prevents any overcompensation phenomenon.

The implementation of the method 100 thus makes it possible to increase or reduce the amplitude of the thrust vector AL12a generated by the internal combustion engine 12a-e of the thrust unit 12a. It can even cause a reversal of the direction of said thrust vector during a total pinching, by the two deflector guides 19a-1, 19a-5, of the thrust vector downstream of the fluid discharge outlet 12a-o of the internal combustion engine 12a-e. Such a counterthrust or thrust reversal can be made possible when said deflector guides are arranged to guide a fluid flow in such a way that at the level of the distal parts of said deflector guides, secondary thrust vectors AL12a' and AL12a" are generated and have reverse directions to that of the original thrust vector AL12a upstream of said deflector guides. Such an actuation causes a technical effect of braking or counterthrust that is particularly beneficial when controlling the propulsion device 10 according to FIG. 2. To be able to implement such a counterthrust, it is also necessary to retain a thrust vector AL12a upstream of the deflector guides 19a-1, 19a-5, having a sufficient amplitude. Using a step 111, as described above, to correct the power command PC generated in the step 110, so that said power command is not less than a lower threshold PCMin is particularly advantageous in this respect. Similarly, a method 100 according to FIG. 8 can comprise a step 112 for limiting the power command PC generated in the step 110 so that the latter does not exceed an upper threshold PCMax. In this way, it is possible to reduce noise nuisance caused by the internal combustion engines of the thrust units on take-off of the aerial propulsion device 10 according to FIG. 2, opening the deflector guides 19a-1 and 19a-5 to compensate for the power deficit thus created. In order to interpret and initialize such lower PCMin and/or higher PCMax thresholds, a method 100 according to FIG. 8 can comprise a step 113 for decoding, or taking account of, an upper limit setpoint HTLI and/or a lower limit setpoint LTLI of the thrust of the thrust unit originating from the navigation controller electronic means 30 of said propulsion device 10.

One and the same thrust vector control method 100 can be implemented to correct the thrust vector of the thrust units 12b, 12c, 12d of the thrust systems TSb, TSc and TSd of the propulsion device 10 shown in FIG. 2. The electronic navigation controller 30 is responsible for sending the adapted thrust commands TC to the four thrust systems TSa to TSd.

The invention has been described through different configurations of thrust systems, more specifically of thrust unit and of thrust vector correction means, comprising respectively two-stroke, four-stroke internal combustion engines, turbojets and electrical-control actuators of the servomotor type, rotary-shaft motors, cam motors etc. The invention is not to be considered limited to these examples of thrusters or actuators only. It relates more generally to correction of a thrust vector delivered by one or more main thrusters, where there is a need to compensate for the responsiveness in response to commands modifying the power (or engine speed). Similarly, the invention is not to be considered limited to the examples of vertical take-off and landing aerial propulsion devices only. The invention can be applied to correction of the thrust vector of a thrust system equipping any propulsion device, whether aerial, aquatic or terrestrial, carrying a load.

The invention claimed is:

1. A method for correcting the thrust vector delivered by a thrust unit of a thrust system comprising processing means arranged to implement said method, said thrust unit comprising a mechanical rotor moved in rotation by a rotary shaft of an internal combustion engine in response to a power command, said method comprising, iteratively:
   a step of converting a thrust command into a rotation speed setpoint of the shaft of the internal combustion engine of the thrust unit;
   a step of producing an error value between said rotation speed setpoint and the measured rotation speed of said shaft, by a measurement sensor cooperating with said internal combustion engine and with said processing means;
   a step of generating the power command based on said error value between said rotation speed setpoint and the measured rotation speed of said shaft of the internal combustion engine so as to reduce said error value and thus control the rotation speed of the shaft of the internal combustion engine;
   wherein:
   the thrust system also comprises one or more secondary electrical thrusters;
   and wherein said method comprises an iterative step, independent of said speed control of the rotation of the shaft of the internal combustion engine, for generating an actuation command of said one or more secondary electrical thrusters based on said error value between the rotation speed setpoint and the measured rotation speed of the shaft of the internal combustion engine.

2. The method according to claim 1, wherein the step of generating the power command comprises producing said power command by multiplication, integration and/or derivation of said error value between said rotation speed setpoint and the measured rotation speed of said shaft.

3. The method according to claim 1, comprising a step of correcting the power command generated so that such a power command is not less than a minimum power command threshold.

4. The method according to claim 3, comprising a step of taking account of a lower or upper limit setpoint of the thrust of the thrust unit and of initialization of a minimum or maximum command threshold.

5. The method according to claim 1, comprising a step of correcting the power command generated so that such a power command does not exceed a maximum power command threshold.

6. The method according to claim 1, wherein the step of actuation of the one or more secondary electrical thrusters comprises generating the actuation command of said one or more secondary electrical thrusters by multiplication, integration and/or derivation of said error value between said rotation speed setpoint and the measured rotation speed of the shaft of the internal combustion engine.

7. A non-transitory computer-readable medium comprising one or more program instructions capable of being interpreted by processing means of a computer, said program instructions being capable of being loaded in a nonvolatile memory thereof, wherein the execution of said instructions by said processing means causes the implementation of a method according to claim 1.

8. A thrust system, comprising a thrust unit, one or more secondary electrical thrusters, and a processor arranged to implement the method for correcting the thrust vector according to claim 1.

9. The thrust system (TSa) according to claim 8, wherein:
the thrust unit comprises:
- a rotary-shaft internal combustion engine the rotation speed of which is a function of the power command generated by the processor; and
- a mechanical rotor moved in rotation by said internal combustion engine;

wherein the one or more secondary electrical thrusters comprise:
- a rotary-shaft electric motor the rotation speed of which is a function of the actuation command of said correction means generated by the processor; and
- a mechanical rotor moved in rotation by said electric motor and delivering an additional thrust vector substantially parallel to the thrust vector delivered by the thrust unit.

10. The thrust system according to claim 9, comprising a motor-generator coupled with the internal combustion engine of the thrust unit in order to convert all or part of the mechanical power generated by said internal combustion engine into electrical power delivered by said motor-generator according to an actuation command generated by the processor.

11. A propulsion device comprising at least one thrust system, according to claim 8, navigation controller means arranged to generate a thrust command capable of being interpreted by the processor of said at least one thrust system.

12. A propulsion device according to claim 11, comprising a platform arranged to receive a load, and support means of the thrust unit of said at least one thrust system, said support means being arranged to orient the thrust vector of said thrust unit in a direction substantially normal to the platform.

13. The propulsion device according to claim 11, wherein said at least one thrust system is arranged to implement a method of control of the thrust force taking account of a lower or upper limit setpoint of the thrust of the thrust unit and of initialization of a minimum or maximum command threshold, wherein the navigation controller means are arranged to develop a lower or upper limit setpoint of the thrust of the thrust unit of said at least one thrust system.

14. The propulsion device according to claim 11, comprising a fairing associated with the platform arranged to protect said load from the environment of said propulsion device.

15. A method for correcting the thrust vector delivered by a thrust unit of a thrust system comprising processing means arranged to implement said method, said thrust unit comprising a mechanical rotor moved in rotation by a rotary shaft of an internal combustion engine in response to a power command, said method comprising, iteratively:
- a step of converting a thrust command into a rotation speed setpoint of the shaft of the internal combustion engine of the thrust unit;
- a step of producing an error value between said rotation speed setpoint and the measured rotation speed of said shaft, by a measurement sensor cooperating with said internal combustion engine and with said processing means;
- a step of generating the power command based on said error value between said rotation speed setpoint and the measured rotation speed of said shaft of the internal combustion engine so as to reduce said error value and thus control the rotation speed of the shaft of the internal combustion engine;

wherein:
the thrust system also comprises a deflector assembly;
and wherein said method comprises an iterative step, independent of said speed control of the rotation of the shaft of the internal combustion engine, for generating an actuation command of deflector assembly based on said error value between the rotation speed setpoint and the measured rotation speed of the shaft of the internal combustion engine.

16. The method according to claim 15, wherein the step of generating the power command comprises producing said power command by multiplication, integration and/or derivation of said error value between said rotation speed setpoint and the measured rotation speed of said shaft.

17. The method according to claim 15, comprising a step of correcting the power command generated so that such a power command is not less than a minimum power command threshold.

18. The method according to claim 17, comprising a step of taking account of a lower or upper limit setpoint of the thrust of the thrust unit and of initialization of a minimum or maximum command threshold.

19. The method according to claim 15, comprising a step of correcting the power command generated so that such a power command does not exceed a maximum power command threshold.

20. The method according to claim 15, wherein the step of actuation of the deflector assembly comprises generating the actuation command of said deflector assembly by multiplication, integration and/or derivation of said error value between said rotation speed setpoint and the measured rotation speed of the shaft of the internal combustion engine.

21. A non-transitory computer-readable medium comprising one or more program instructions capable of being interpreted by processing means of a computer, said program instructions being capable of being loaded in a non-volatile memory thereof, wherein the execution of said instructions by said processing means causes the implementation of a method according to claim 15.

22. A thrust system, comprising a thrust unit, a deflector assembly, and a processor arranged to implement the method for correcting the thrust vector according to claim 15.

23. Thrust system according to claim 22, wherein:
the thrust unit comprises a turbojet having a fluid discharge outlet;
the deflector assembly comprises:
- a pair of deflector guides mounted in rotation and mutually arranged to deflect, downstream of the fluid discharge outlet, all or part of the thrust vector of the thrust unit in one or more directions substantially normal to the direction of said thrust vector at the fluid discharge outlet of the turbojet;
- electric actuators arranged to interpret the actuation command and to cause respectively a rotation of the deflector guides.

24. A propulsion device comprising at least one thrust system, according to claim 22, navigation controller means arranged to generate a thrust command capable of being interpreted by the processor of said at least one thrust system.

25. A propulsion device according to claim 24, comprising a platform arranged to receive a load, and support means of the thrust unit of said at least one thrust system, said support means being arranged to orient the thrust vector of said thrust unit in a direction substantially normal to the platform.

26. The propulsion device according to claim 24, wherein said at least one thrust system is arranged to implement a method of control of the thrust force taking account of a lower or upper limit setpoint of the thrust of the thrust unit and of initialization of a minimum or maximum command threshold, wherein the navigation controller means are arranged to develop a lower or upper limit setpoint of the thrust of the thrust unit of said at least one thrust system.

27. The propulsion device according to claim 24, comprising a fairing associated with the platform arranged to protect said load from the environment of said propulsion device.

* * * * *